United States Patent [19]

Hutchins

[11] Patent Number: 4,994,966
[45] Date of Patent: Feb. 19, 1991

[54] SYSTEM AND METHOD FOR NATURAL LANGUAGE PARSING BY INITIATING PROCESSING PRIOR TO ENTRY OF COMPLETE SENTENCES

[75] Inventor: Sandra E. Hutchins, Del Mar, Calif.

[73] Assignee: Emerson & Stern Associates, Inc., San Diego, Calif.

[21] Appl. No.: 176,133

[22] Filed: Mar. 31, 1988

[51] Int. Cl.[5] .............................................. G06F 15/21
[52] U.S. Cl. ...................................... 364/419; 364/900
[58] Field of Search ............... 364/419, 364, 200, 900

[56] References Cited

U.S. PATENT DOCUMENTS

| | | |
|---|---|---|
| 3,704,345 | 11/1972 | Coker et al. |
| 3,969,698 | 7/1976 | Bollinger et al. |
| 3,995,254 | 11/1976 | Rosenbaum |
| 4,010,445 | 3/1977 | Hoshino |
| 4,136,395 | 1/1979 | Kolpek et al. |
| 4,342,085 | 7/1982 | Glickman et al. |
| 4,355,302 | 10/1982 | Aldefeld et al. |
| 4,355,371 | 10/1982 | Convis et al. |
| 4,373,192 | 2/1983 | Yanagiuchi et al. ............... 364/419 |
| 4,383,307 | 5/1983 | Gibson, III |
| 4,456,969 | 6/1984 | Herzik et al. |
| 4,498,148 | 2/1985 | Glickman |
| 4,580,241 | 4/1986 | Kucera |
| 4,586,160 | 4/1986 | Amano et al. ...................... 364/419 |
| 4,641,264 | 2/1987 | Nitta et al. ......................... 364/419 |
| 4,674,066 | 6/1987 | Kucera |
| 4,706,212 | 11/1987 | Toma .................................. 364/900 |
| 4,783,761 | 11/1988 | Gray et al. |
| 4,787,038 | 11/1988 | Doi et al. ........................... 364/900 |
| 4,864,502 | 9/1989 | Kucera et al. ...................... 364/419 |

OTHER PUBLICATIONS

Johnson, *Software Model Adds Parallelism*, Electronic Engineering Times, Mar. 14, 1988, pp. 71, 74.
Flynn, *Businessoft Program to Check Spelling, Grammar, and Usage*, InfoWorld, Apr. 14, 1986, p. 10.
Advertisement, *Introducing a Better Idea . . . ,* Smith-Corona Corp., Mar., 1988.

Primary Examiner—Michael R. Fleming
Assistant Examiner—Gail O. Hayes
Attorney, Agent, or Firm—Kirkland & Ellis

[57] ABSTRACT

A system and method for parsing natural language is provided. The system comprises a plurality of computer program code modules which address a plurality of predetermined lookup tables. Strings of characters, such as words, assigned one or more syntactical tags identifying the grammatical roles the strings can play are stored in a dictionary and retrieved as a system user inputs text to be processed. The tags are manipulated by a phrase parsing program module and translated into phrases according to grammatical rules stored in a lookup table. Sequences of the phrases corresponding to input sentences are maniplated by a sentence checking program module which consults another suitable rule table. The system and method optionally provide help in identifying grammatically incorrect passages in the input text.

54 Claims, 15 Drawing Sheets

SYSTEM AND METHOD FOR NATURAL LANGUAGE PARSING BY INITIATING PROCESSING PRIOR TO ENTRY OF COMPLETE SENTENCES

This invention was made with Government support under SBIR Contracts No. 400-85-1011 and No. 400-86-0061 awarded by the Department of Education. The Government has certain rights in this invention.

BACKGROUND

The present invention relates to systems and methods for parsing languages in open-ended semantic domains.

Prior parsing systems are directed mainly toward computer languages which tend to be structured to minimize ambiguity. Consequently such parsing systems have very limited applicability to natural languages, such as English, that are replete with ambiguous, yet valid, constructions. These prior parsing systems for computer languages are described in Aho, Alfred V., et al., *Principles of Compiler Design*, Massachusetts, Addison-Wesley, 1979.

Other approaches for parsing natural languages are described in Sanger, Naomi, *Natural Language Information Processing*, Massachusetts, Addison-Wesley, 1981 and King, Margaret, ed., *Parsing Natural Language*, New York, Academic Press, 1983. The systems described in these works typically employ syntax-driven approaches similar to those used in parsing computer languages that emphasize meaning extraction in a limited semantic domain, i.e., a limited set of syntactic structures and a limited vocabulary. Where a parsing system emphasizes a syntactic approach, it attempts to derive the "true" parse, i.e., to determine the true underlying grammatical structure of a sentence.

In contrast, the present system and method does not attempt to check the grammatical acceptability of the underlying structure of the sentence. The present approach is based on the appreciation that simpler, more superficial structures are adequate for describing most of English, most of the time. Such simpler structures can be handled in less time with less memory than the prior art approaches, therefore the present approach is more acceptable to users of small computers or word processors.

An approach to natural language parsing that was used by systems in the prior art involved a 15,000-word dictionary addressed by a grammar program module and was based on the notion of triples of tags. Tags identifying the grammatical roles words can play were assigned to each entry in the dictionary and a list of accept-able triple of tags, such as "article,adjective,singular-noun" and "adjective,singular-noun,singular-verb," was created. Thousands of these triples were needed to describe text generated even by young children. A sentence was found acceptable by the grammar program module if it was possible to string together overlapping triples from the list to match the list of tags provided from the dictionary. For example, the sentence "the yellow cat jumps" would be accepted by the grammar module with the two triples cited above.

This approach to grammar was found to be inadequate because the larger number of triples needed to describe the wide variety of acceptable grammatical structures required too much memory and many sentences with glaring errors were inevitably accepted by the grammar module. For example, errors of agreement between words separated by more than a few intermediaries cannot be caught by such a model. This triples approach has been used in the approach to grammatical constraints in speech recognition employed by the International Business Machines Corporation.

Among other prior text processing systems, U.S. Pat. No. 3,704,345 discloses a system for converting printed text into speech sounds. The system includes a syntax analyzer that consults a phoneme dictionary, choosing a grammatical category for each word in an input sequence and assigning a phrase category to each word. The syntax analyzer may realize a logic tree representing each state of a sentence with each branch in the tree being matched to a word in the input sequence. Also, the decision logic may be implemented in a computer program operating as a matrix in which rows represent predetermined states of a sentence and columns represent the word class to be incorporated into the sentence. This type of system is limited in the variety of sentences it can process successfully because of the rigidly defined logic tree embodied in its syntax analyzer.

Other references in the prior art disclosing systems for checking or correcting the spellings of input character strings are U.S. Pat. No. 4,674,066, U.S. Pat. No. 4,580,241, U.S. Pat. No. 4,498,148, U.S. Pat. No. 4,456,969, U.S. Pat. No. 4,383,307, U.S. Pat. No. 4,355,371, U.S. Pat. No. 4,136,395, and U.S. Pat. No. 3,969,698. Some of these systems address compressed or efficiently packed dictionary lookup tables in processing words which may be spelled incorrectly. Other prior art references describing compressed dictionary tables or packing techniques are U.S. Pat. No. 4,355,302, U.S. Pat. No. 4,342,085, U.S. Pat. No. 4,010,445 and U.S. Pat. No. 3,995,254.

The prior parsing systems have had the great disadvantages of requiring large amounts of computer memory and processing time for their operation, failing to locate many common errors and locating as errors many text passages which are in fact correct. These systems are incapable of achieving a first object of the present invention, i.e., on-the-fly operation in which the system makes as much progress as possible in parsing the input text as each character is input.

Another object of the present invention is to provide a parsing system which is operable with text input from a keyboard, voice entry, or similar device and text previously stored in a suitable memory.

A further object of the invention is to provide a parsing system which makes efficient use of program modules and lookup tables, permitting use with commonly available personal computers or word processing typewriters.

A still further object of the invention is to provide a parsing system having great flexibility, permitting processing of text written in one of a plurality of languages.

SUMMARY OF THE DISCLOSURE

These and other objects and advantages are provided by a language parsing system which comprises means for determining syntax tags associated with input strings of characters, means for parsing the input strings of characters using their associated syntax tags, means for checking the results of the parsing means and control means for coordinating the operations of the other means. A method in accordance with the present invention comprises the steps of assigning predetermined syntax tags to each of a plurality of character strings, parsing sequences of input character strings by grouping the assigned syntax tags into phrases, and checking the grammatical validity of the input by verifying the sequences of phrases.

BRIEF DESCRIPTION OF THE DRAWINGS

The present invention will be understood from a reading of the following detailed description in conjunction with the drawings in which.

DETAILED DESCRIPTION

The method of the present invention can be implemented in computer program code which examines input text and a plurality of suitably constructed lookup tables of grammatical rules to determine the nature and location of grammatical errors in the input text. It will thus be appreciated that the method can be properly modified through changes to either or both of the program code and the lookup tables. For example, appropriately changing the lookup tables would allow the code to examine input text written in a language other than English.

Overview of Operation

Figure 1:
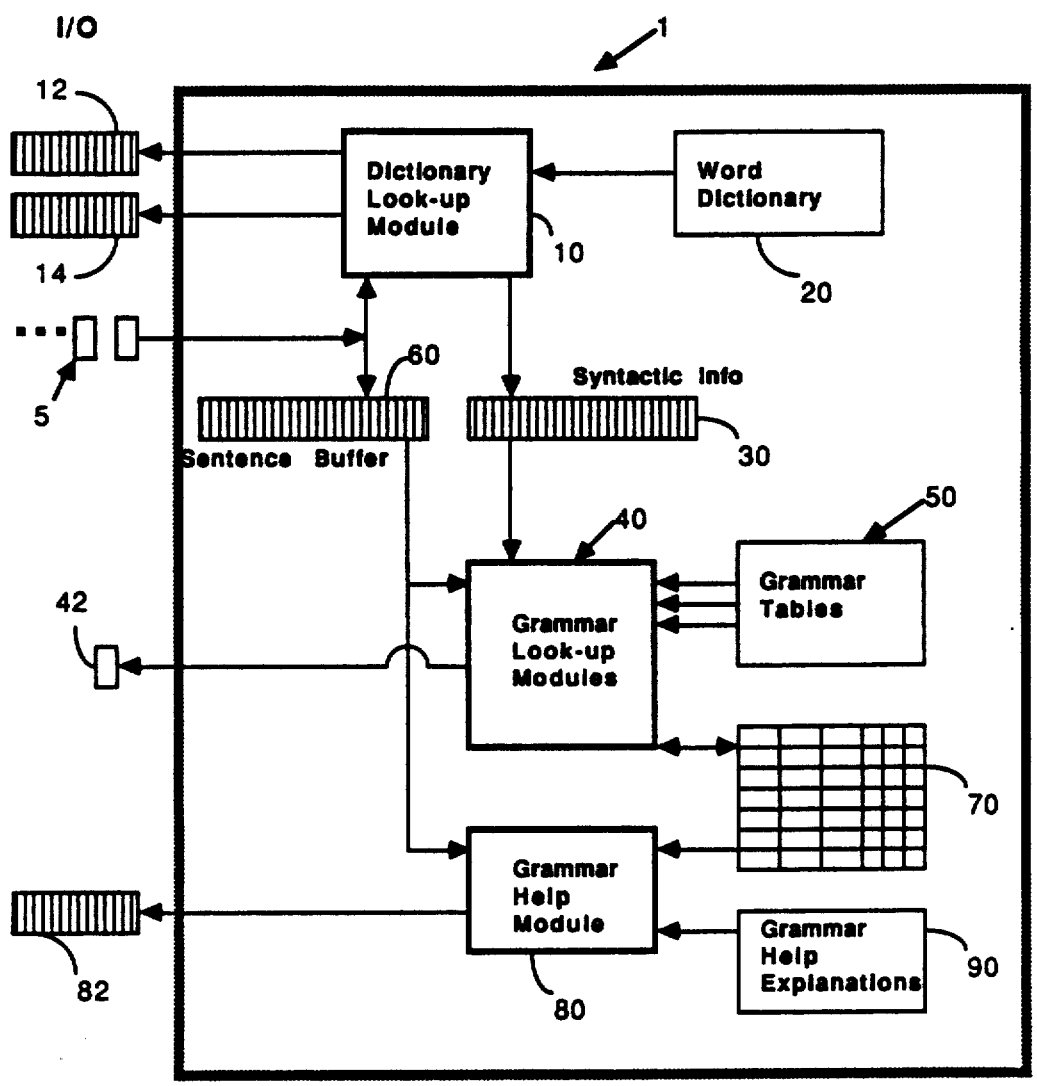
FIG. 1 is a block diagram of a parsing system in accordance with the present invention.

FIG. 1 is an overview of a computer software system 1 in accordance with the present invention. A dictionary module 10 comprising suitable program code addresses a word dictionary 20 to provide syntactical information 30 to a plurality of grammar modules 40. The grammar modules 40 also comprise program code which addresses grammar lookup tables 50 that will be described in more detail below. It will be understood that the software system 1 can operate in conjunction with any voice entry or word processing program or other suitable device for user interface since a system in accordance with the present invention can function independently of the word processors scheme for interacting with the user.

Characters 5 of text to be processed are fed serially to the present system from an input device such as a voice entry system or keyboard (not shown) or from a data file previously stored. An advantage of the present system is that the "characters can be fed in and processed as the user types", i.e., the system can operate "on-the-fly," thus providing immediate feedback to the user. As each character is entered, it is stored in a sentence buffer 60 and used to advance the process in the dictionary module 10. The dictionary module 10 repetitively searches the word dictionary 20 for the input string as each character is entered. When an input string of characters terminates with a space or punctuation mark, such character string is deemed to constitute a word and syntactic information 30 for that string of characters comprising the word is passed to the grammar modules 40.

If the input word or character string is not found in the dictionary 20, the dictionary module 10 flags the presumed "spelling error" by writing the word character string to a spelling output buffer 12 and setting an error flag 14 that indicates the number of characters in error (the user interface or word processing program may then use this information to signal the user). In addition, the dictionary module 10 may deduce from the string's ending the most likely syntactic roles for the "unknown" word and pass this information to the grammar modules 40. If the string is found in the dictionary 20 but it contains capitalization errors as entered, the syntactic information 30 found in the dictionary 20 is passed to the grammar modules 40 and the user is informed of the capitalization errors via the spelling output buffer 12.

As each batch of syntactic information 30 describing a word or a word-plus-punctuation is passed to the grammar modules 40, the grammar modules advance the grammar lookup process by attempting to find "rules" in their tables 50 that describe the stream of syntactic information. Ordinarily the lookup tables 50 include only "good" rules, i.e., those that describe valid grammatical constructs. In one aspect of the invention, when a grammar help module 80 is provided, lookup tables 50 contain both "good" rules and "bad" rules, i.e., those that describe deviations from the "good" rules, i.e., common erroneous constructs. In either case, an input sentence, i.e., string of words, is assumed to be correct until either: (1) the only descriptions of the sentence all involve "bad" rules, or (2) no rules of either type can be found to describe the sentence. When either of these conditions occurs a grammar output flag 42 signals an error to the user. In addition, if the parsing process has failed due to condition (2), no grammar help will be available. If the parse fails due to condition (1), grammar help can be provided identifying those words in the input text that were used in "bad" rules.

For example, if the user types "the the book is mine", the only rule available to parse the beginning of the sentence is the "bad" rule: "definite-article,definite-article,singular-noun=bad-singular-noun-phrase". Grammar help, if provided, then writes "the the book" to a grammar output buffer 82. As explained in more detail below, this example relies on a "bad" rule used in a phrase parsing module of the grammar modules 40. In a similar vein, "bad" rules can be employed in other grammar modules (phrase combining and sentence checking) as well. The grammar help module 80 addresses a table 90 of explanations in selecting help for a "bad" rule.

In an implementation for the Apple II series of computers, a total of 9K bytes of memory are employed for the grammar modules 40 and grammar help module 80 and associated data areas, with 5.5K bytes comprising the program code and 3.5K bytes comprising active data. The lookup tables 50 in such an implementation employ a total of 11K bytes, with 3K devoted to a table addressed by the phrase parsing module, 1K to a table addressed by the phrase combining module, and 7K to a table addressed by the sentence checking module. This last amount includes an additional 30%-50% for incorporating "bad" rules. It will be appreciated from the system's advantageously small requirements for random-access and read-only memory (ROM) that the system and method of the present invention can be embodied in conventional word-processing typewriters and other dedicated systems, as well as in conventional computers.

Dictionary Module and Word Dictionary

Figure 2:
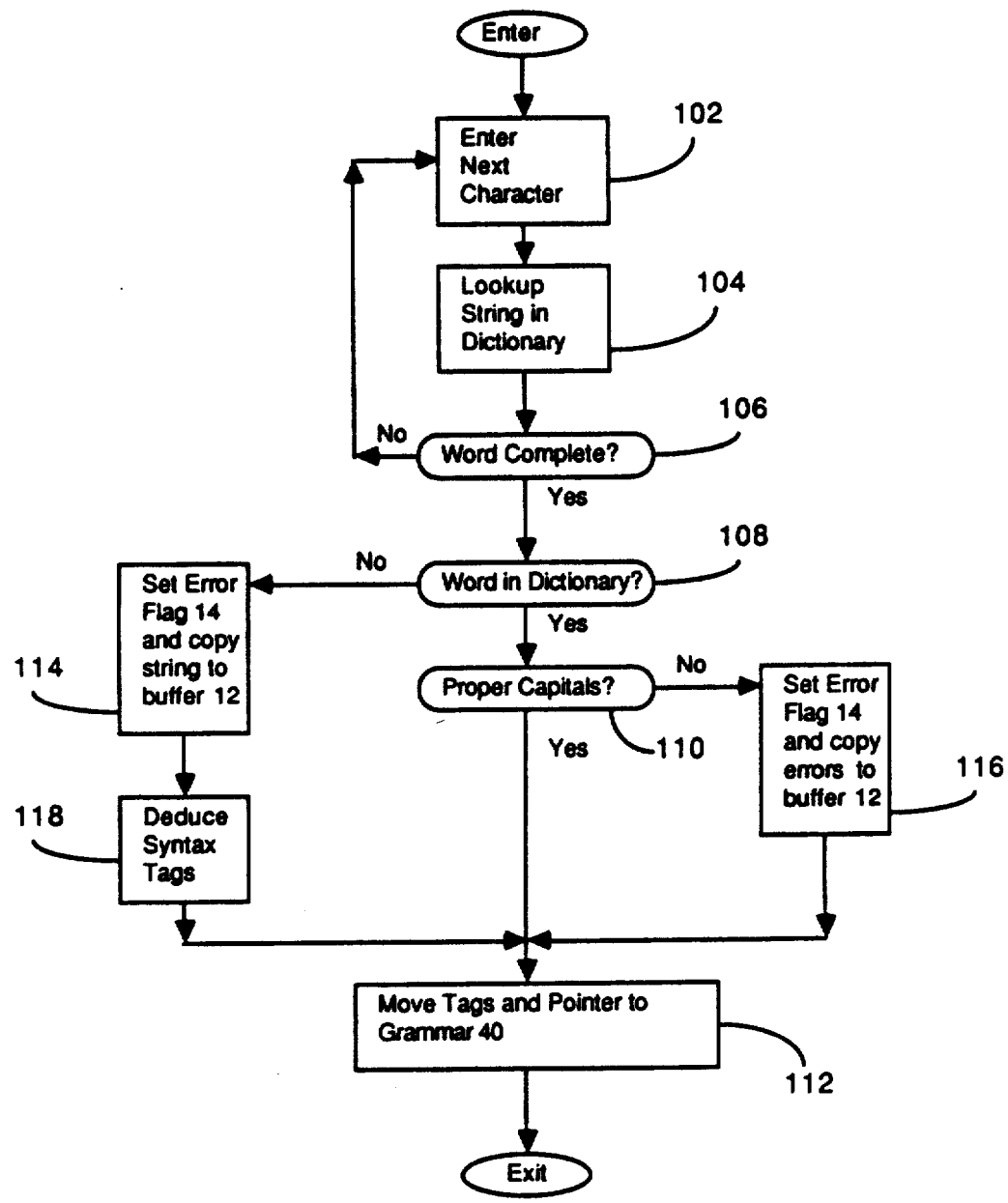
FIG. 2 is a flowchart of the operation of means for determining syntax tags for use in the parsing system.

Referring now to FIG. 2, there is shown a flow chart for the operation of the dictionary module 10. As each character of a word or string is entered (step 102), it and any earlier characters entered since the last string was found in the dictionary are looked up (step 104) in the dictionary 20. If the string is not yet complete (step 106), as indicated by the absence of a terminating space or suitable punctuation mark, the dictionary module 10 waits for the next character in the string to be entered, then repeats the lookup process with the additional character. When a space or punctuation mark is input, the string is treated as complete and the process in the module 10 advances, indicating whether the input string was found in the dictionary 20 (step 108). If the input word was found, the module 10 verifies the proper capitalization of the string (step 110) and moves the one or more syntactical tags associated with the string and a word pointer marking the end of the string in the sentence buffer 60 (see FIG. 1) to the grammar modules 40 (step 112). The syntactical tags and word pointer comprise the syntactical information 30.

When an input string is not found in the dictionary 20, the module 10 operates to set the spelling output flag 14 and write the "unknown" string to the spelling output buffer 12 (step 114). Similarly, when the input string is found in the dictionary but its capitalization is other than that stored, the string is written to the output buffer 12 and the characters in error may be highlighted (step 116). In the former case, the module can deduce appropriate syntactical tags for the "unknown" input (step 118) by examining the last few characters in the string and applying a comparatively small number of predetermined syntax rules as explained in more detail below. Such syntax rules are well-known for each language, e.g., "ing" endings usually indicate verb forms and "ly" endings may indicate adverbial forms, for English. The module 10 then moves the syntactical information 30 comprising the deduced syntax tags and the word pointer to the grammar modules 40.

Besides the word pointer, the syntactic information 30 from the dictionary module 10 and word dictionary 20 consists of a list of tags that represent the syntactic roles that each word can play. Table I gives a list of syntactical tags suitable for use in the present invention. While fewer than 128 tags can identify all the roles most common English words can play, thereby allowing each tag to be uniquely represented by a single byte in a conventional small computer, this is not necessary; more than 128 tags could be used to handle special cases of various sorts by representing some tags with two byte codes.

As an example of how more than 128 tags can be used, consider the tags for verb forms listed in Table I. The group of five tags beginning with Z describe verbs, such as "know" and "think," that can take entire sentences as objects, as in "I know you are here." (Of course, these same verbs can also take non-sentential objects, as in "I know that.") Many other verbs are described by the group of five tags beginning with V, but these could be further divided into several categories, each having its own group of tags. One such basis for categorization is to assign groups of tags to verbs according to the number of objects the verbs can take. For example, the word "give" as a verb can take two objects, as in "give him the book," while other verbs take only one object and still others take no object. Assigning more tags in this way would allow more precision in identifying word misuses, although it would also increase the total number of tags to more than 128. It will be understood that the other tag groups listed in Table I may be similarly subdivided and each resulting category assigned its own group of tags.

Among the characteristics of the syntactical tags assigned to words in the dictionary 20 are the following:
(1) since many English words play more than one syntactic role, an English dictionary 20 generally includes a plurality of tags for each word;
(2) since some words, e.g., contractions, are two words bundled into one, the dictionary includes pairs of tags that must be used together.

For example, the word "work" can be a noun (as in "the work was difficult") or a verb (as in "they work well together"). The dictionary 20 must include two tags associated with the word "work" and the grammar modules 40 must consider both of these possible uses in parallel. On the other hand, the word "isn't" represents "is" followed by "not," thus the grammar modules must use both tags in sequence (called a "compound"). In addition, some words are described by both single tags and compounds, e.g., "boy's" may be described by a single tag for a possessive (as in "the boy's book was . . ."), a compound describing the two words "boy is" (as in "the boy's glad"), and another compound describing the two words "boy has" (as in "the boy's got it").

In general, the syntactical tags and compounds stored in the dictionary 20 are conventionally assigned from a basic knowledge of the particular language of the input text and from observations of the manner in which words are currently used in newspapers, children's compositions, business correspondence, etc. A dictionary 20 of words with appropriate taggings can be constructed in this way.

To adapt a dictionary 20 for a particular field, such as medicine, that employs special words and grammar, documents from the field can be scanned with the aid of suitable computer programs to identify words that are not already in the dictionary. For all new words identified, the scanned documents and standard dictionaries for the field are reviewed to determine appropriate syntactical tags for each new word. Among the considerations relevant in determining tags for a word are, for example, whether the word is used as a noun; if it is a noun, whether the word occurs in the plural; and whether the word can be used without modifiers.

In deducing syntax tags for words not found in the dictionary 20, a set of twelve deduction rules is adequate when an English dictionary gives good coverage of the system user's vocabulary. As explained in more detail below, when the dictionary does not provide good coverage (i.e., when many input words are not found in the dictionary, such as when the user's vocabulary includes a significant number of foreign words or jargon that do not obey the language's usual syntax rules) the set is readily supplemented. The basic set of deduction rules assign to untagged input words the most general tags possible, e.g. NABS for abstract nouns, and ZVB for sentential verbs, rather than syntactically more restrictive tags, e.g., NCOM for common nouns and VB for simple verbs. The basic set of deduction rules, that may be applied to untagged input strings in the order listed, is:

| String Ending | Tags Assigned |
|---|---|
| -'s | NAPOS (NABS BEZ) (NABS HVZ) |
| -ss | NABS ZVB |
| -us | NABS ZVB ADJ |
| -s | NCOMS ZVZ |
| -ed | ZVD ZVN NABS |
| -en | ZVN NABS |
| -er | ADJR NABS ZVB |
| -ly | AVRB |
| -s' | NSPOS |
| -ing | ZVG |
| -est | ADJT NABS ZVB |
| all others | NABS ZVB ADJ | in which compounds are indicated by parentheses. By assigning syntactically more general tags to untagged input words, the system provides maximal flexibility of grammatical usage to those untagged words.

It will be understood that a system in accordance with the present invention can advantageously operate with existing dictionary modules and tables in which syntactical tags have not been associated and stored with the table entries. For such a system, the present dictionary module 10 and dictionary lookup table 20 would be simply modified so that tags for use by the grammar modules are deduced from the ending of each word input from the existing dictionary. The deduction rules applied by the dictionary module 10 in this case would be only slightly more numerous, adding a few somewhat more restrictive rules, and a list of common exceptions to these rules would be provided in the lookup table 20. Examples of such exceptions for English are the word "thing," in which a character string ending in "ing" is not a verb form, and the word "fly," in which a string ending in "ly" is not an adverb. In this way, a system in accordance with the present invention can operate with any type of existing dictionary, such as those disclosed in the prior patents cited above, including dictionaries in which the table entries are tightly packed or otherwise compressed to minimize the amount of memory required for storing it.

It will be further understood that the program code and rule table for deducing tags for input words can be suitably incorporated, if desired, in the grammar modules 40 and grammar tables 50.

As described in more detail below, additional tags are used internally in the grammar modules 40 that do not appear in the dictionary 20. In accordance with the present invention, the dictionary's tags are mapped to other tags used in the grammar modules so that the number of grammatical rules required to describe all common grammatical constructs is reduced.

Grammar Modules and Rule Tables

Figure 3A:
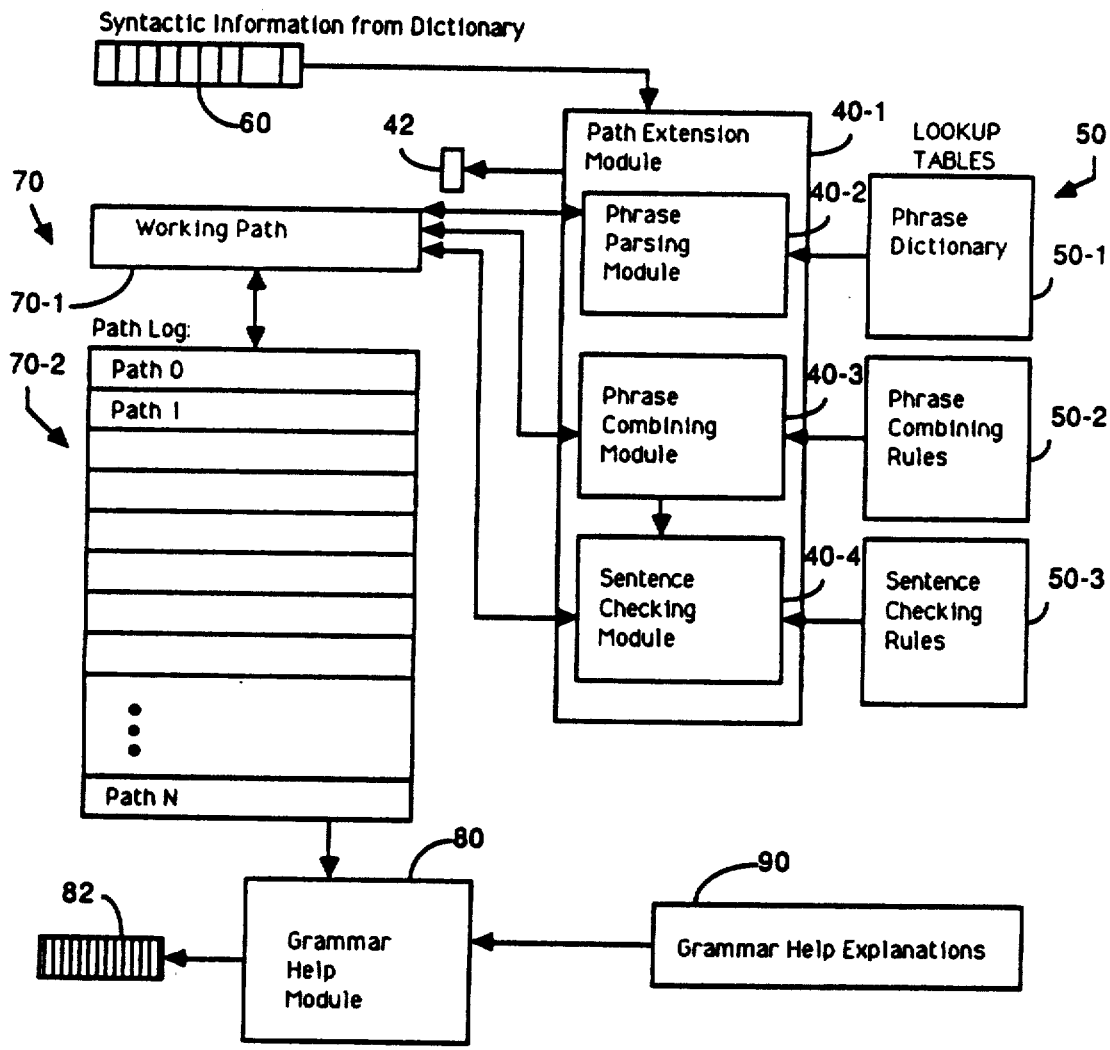
FIG. 3a is a block diagram of a portion of the parsing system in accordance with the invention.

Referring to FIG. 3a, when the dictionary module 10 has determined the syntactical information 30 associated with an input word, the information 30 is transferred to the grammar modules (program code) 40 comprising a path extension module 40-1, a phrase parsing module 40-2, a phrase combining module 40-3, and a sentence checking module 40-4. In the present embodiment, the path extension module 40-1 schedules and coordinates the activity of the other three grammar modules, although it does not directly activate the sentence checking module 40-4. The grammar modules 40 address the grammar lookup tables 50 comprising a phrase dictionary 50-1, a table of phrase combining rules 50-2, and a table of sentence checking rules 50-3.

As an aid in understanding the present invention, the process of parsing a sentence is similar to the process of threading one's way through a maze. The information that describes a given position in the maze is called a "grammar path". In accordance with the present invention, the parsing process proceeds by advancing a grammar path in response to a syntactical tag input from the dictionary module 10 and word dictionary 20. This basic "step" is repeated for each of a plurality of paths that arise parallel from each batch of tags transferred from the dictionary module 10 to the grammar modules 40.

In general, each path is advanced by:
(1) combining a newly input syntactical tag and previously input tags into higher constructs called "non-terminals" (phrase parsing module 40-2);
(2) combining certain non-terminals into other, higher non-terminals (phrase combining module 40-3); and
(3) checking the validity of the sequence of non-terminals that result from phrase combining (sentence checking module 40-4).

Table II lists non-terminals suitable for use in the present invention, including "bad" non-terminals used to continue the parsing process in spite of input grammatical errors.

The operation of the grammar modules 40 is conveniently illustrated with the following exemplary sentence:

The book and the pen are on the table.

The syntactical tags (Table I) associated with the words of the sentence are output from the dictionary module 10 to the phrase parsing module 40-2 which transforms them, if possible, into a sequence of non-terminals or phrases stored in the phrase dictionary 50-1, giving:

*Snbs, Sand, Snbs, Sber, Sin, Snbs*

This sequence of non-terminals may be more intelligible to the reader as:

*singular-noun-phrase, and singular-noun-phrase,*

*plural-present-be,*

*preposition, singular-noun-phrase.*

Each sequence of non-terminals produced by the phrase parsing module 40-2 is then further compressed by the phrase combining module 40-3 which generates another sequence of non-terminals:

*Snbp, Sber, Spp* that may be more intelligible as:
*plural-noun-phrase, plural-present-be, prepositional-phrase.*

When the phrase combining module 40-3 produces a contiguous stream of non-terminals from the start to the finish of a sentence as in the above example, the sentence checking module 40-4 examines the sequence to verify, among other things, that the numbers of the subject and the verb agree, that a suitable object for the verb exists, and that the last non-terminal in the stream is a proper sentence end. For the exemplary sentence, the plural-noun phrase subject ("the book and the pen") agrees with the plural verb ("are"), the plural verb can have a prepositional phrase ("on the table") as an object, and a prepositional phrase can properly end a sentence. Other verifications, such as that every verb in a sequence has a subject, are also carried out by the sentence checking module 40-4 that are discernible in a straightforward way from a common knowledge of a given language. It will be understood that while many grammatical errors, or deviations from the rules, may seem so basic that they would never occur, for children and non-native users of a language, and indeed even for native users of word processors, so-called "obvious" errors must be identified by the grammar modules.

In principle there are many ways to organize the parsing process, but the organization of the present embodiment minimizes the amount of memory required to describe the rules of grammar. For example, a separate step of phrase combining is not necessary in a theoretical sense because everything it does could be accomplished by adding more rules to the phrase dictionary 50-1 for application by the phrase parsing module 40-2. Nevertheless, broadening the task of the phrase parsing process in that way requires far more memory than the present embodiment in which the "rules" for phrase combining are relatively brief. Indeed, prior art parsers for computer languages (a far simpler situation) tend to be constructed entirely of "rule systems" in the manner of the sentence checking module 40-4 and sentence checking rule table 50-3. Such a set of rules for English would be unwieldy. Breaking the parsing process into steps in accordance with the present invention produces simple modules and simple tables, each with modest data requirements, rather than one large module and one large table with excessive data requirements.

Grammar Paths

As a consequence of the organization of the grammar modules 40 and of the on-the-fly operation of the system 1, the system 1 processes a plurality of parallel grammatical paths. Each path comprises data, shown schematically FIG. 3b, that are sufficient to describe the state of each of the phrase parsing, phrase combining, and sentence checking processes (i.e., the current location in the "maze"). As described in more detail below, the variables in each path are suitably manipulated during the processes carried out by the phrase parsing, phrase combining and sentence checking modules. It will be appreciated that many of the variables comprising a grammar path can be merely a single bit in length, as determined by the amount of information represented by the given variable.

Parallel grammatical paths arise because words in the dictionary 20 often have more than one syntactical tag associated with them, thus all those tags must be processed in parallel. For proper English, at some point during processing one or more of the paths will "die out." Even an input sequence of single-tag words can result in multiple parallel paths since the phrase parsing module 40-2 may find several ways to combine the sequence of tags into phrases.

As an example of both these ways parallel paths can arise, consider the phrase "the boy books." The dictionary module 10 would retrieve the following syntactical tags from the dictionary 20 for each of the words in that phrase:

THE, NCOM, NCOMS and VBZ where the tag THE denotes a determiner ("the"), the tag NCOM denotes a common noun ("boy"), and the tags NCOMS and VBZ denote a plural noun ("books") and a simple verb in the present tense ("books"), respectively. In accordance with the present invention, the grammar modules 40 consider all possible sequences of retrieved tags; in this example:

$$THE\ NCOM\ NCOMS \qquad (1)$$

and $$THE\ NCOM\ VBZ \qquad (2)$$

The phrase parsing module 40-2 transforms tag sequence (1) into two non-terminal sequences:

$$Snbs\ Snbp\ (as\ in\ ``[give]\ the\ boy\ book") \qquad (1')$$

and $$Snbp\ (as\ in\ ``the\ boy\ books\ [are\ blue\ and\ the\ girl\ books\ are\ red]") \qquad (1'')$$

while transforming tag sequence (2) into the non-terminal sequence:

$$Snbs\ Svbz\ (as\ in\ ``the\ boy\ books\ [a\ flight\ldots ")\qquad (2')$$

Thus, three simple words generate two tag sequences which in turn generate three possible non-terminal sequences. Which of the three non-terminal sequences (1'), (1''), and (2') is the correct parsing of the phrase "the boy books" is determined by processing more of the sentence in which the phrase is embedded.

Path Extension Process

The path extension module 40-1 manages the parallel grammar paths inevitably produced during processing of even simple sentences by keeping track of the paths in a path data area 70. The path data area 70, shown in FIG. 3a, includes a working path 70-1, which is the path currently being processed, and a path log 70-2, which is a list of the parallel paths that have arisen in the parsing process. Each grammar path in the path log 70-2 can assume one of three states: (1) path active and ready for processing, (2) path active and already processed, or (3) path not in use. When the grammar modules 40 begin processing a new batch of syntactical tags input from the dictionary module 10, all paths in the path log 70-2 are of types 1 or 3.

Figure 4:
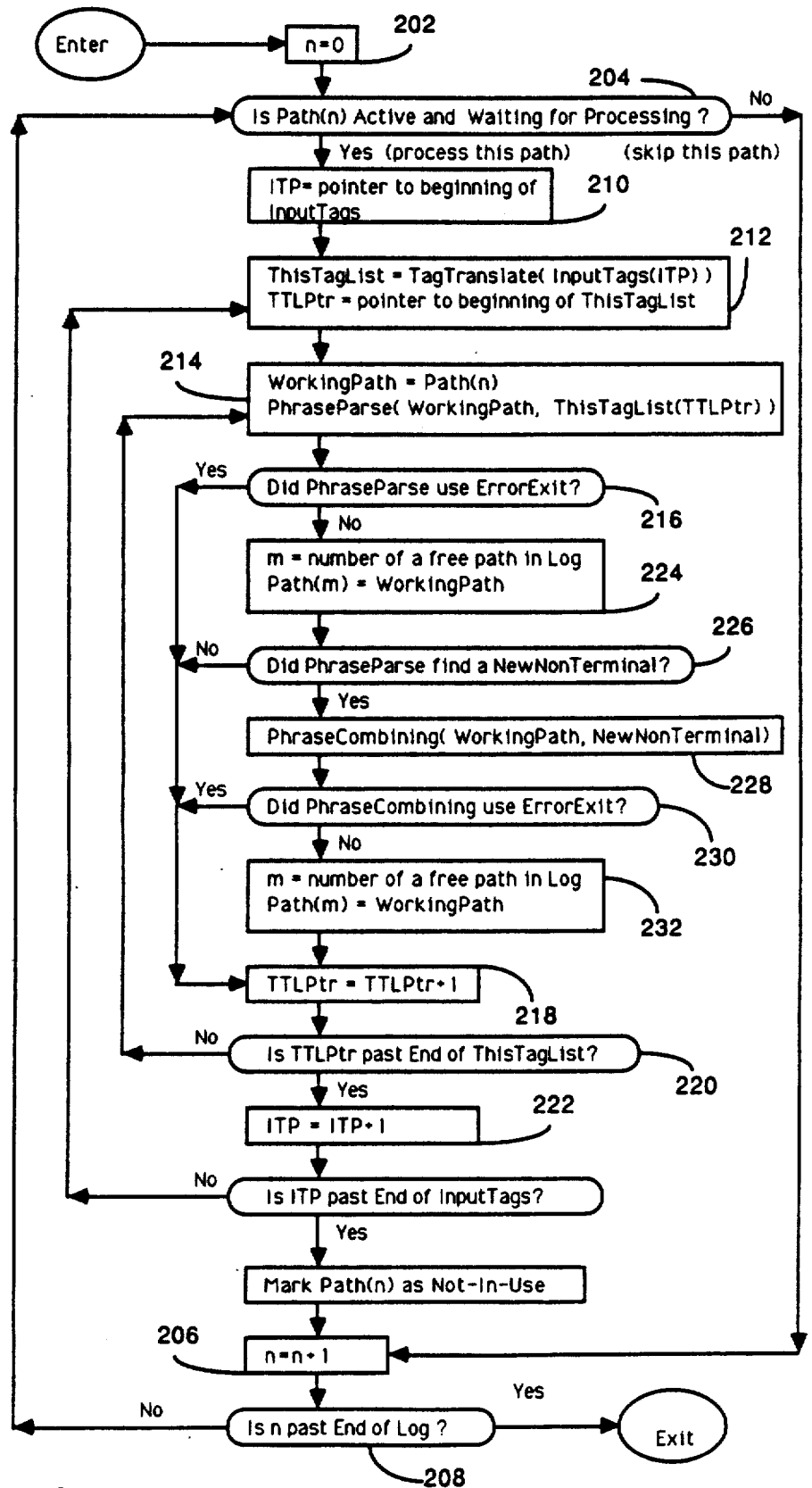
FIG. 4 is a flowchart of the operation of a path extension program module in accordance with the present invention.

Referring to FIG. 4 which shows the steps carried out by the path extension module 40-1, the program first initializes a path log index n to zero (step 202) and tests whether the zeroeth path in the path log 70-2 is in state (1). active and ready for processing (step 204). If it is not, the path log index n is increased by one (step 206) and the new index is tested (step 208) to determine whether no more paths in the path log 70-2 remain to be processed. If no more paths remain, the program exits to the phrase parsing module 40-2 as described below, otherwise it tests whether the new-index path in the path log is in state (1). In applying the present system and method to English text produced by children, about fifty paths are a sufficiently large path log 70-2. For English text produced by adults, between sixty and one hundred paths are generally sufficient to accommodate adults' use of more complex sentence structure and more ambiguous words.

When a path is found in state (1) (step 204), a pointer ITP is initialized (step 210) to the memory location at which the batch of syntactical tags for the input word begins. The first tag in the input batch is then translated (step 212) to other, more efficient tags used in the phrase parsing module 40-2 as described further below. The translated tags are listed and a pointer TTLPtr is initialized to the beginning of the translated tag list. The path previously identified as in state (1) is then copied from the path log 70-2 to the working path 70-1 and the working path and the first tag on the translated tag list is processed by the phrase parsing module 40-2 (step 214).

If an error was found in the phrase parsing module 40-2 in processing the first tag on the translated tag list (step 216), the pointer TTLPtr is increased by one (step 218) and the working path 70-1 and second listed tag, if there is one (step 220), is processed by the phrase parsing module 40-2. If there is no other translated tag, the pointer ITP is incremented (step 222) and the next tag in the batch for the input word is translated, the pointer TTLPtr is reinitialized (step 212), and the process continues.

When no error is found by the phrase parsing module 40-2 in processing a translated tag (step 216), the now extended working path 70-1 is stored in the path log 70-2 in an unused position, i.e., a path in state (3) (step 224). If a new non-terminal has been found by the phrase parsing module 40-2 (step 226), the extended working path is then processed by the phrase combining module 40-3 (step 228), otherwise the pointer TTLPtr is incremented (step 218) and the next translated tag is sent to the phrase parsing module 40-2 with the non-extended working path (step 212). If the phrase combining module 40-3 finds no errors (step 230), the working path 70-1 is written to another unused path in the path log 70-2 (step 232).

From the foregoing it can be seen that each tag on the translated tag list has the potential to generate two new paths to replace each original active path in the path log 70-2. The first new path appears when a valid extension is found by the phrase parsing module 40-2 and the second appears when the phrase parsing module produces a non-terminal and the phrase combining module 40-3 successfully processes the non-terminal. When compound tags are encountered in the input batch of tags they are handled in a manner slightly different from the processing given above for single tags. For a compound, the path is copied from the path log 70-2 to the working path 70-1 and the working path is extended with the first tag in the compound. If two paths result, the one generating a non-terminal is selected and the working path is again extended with the second tag in the compound (before saving the working path to the log). After extension with the second tag the usual processing takes over. If processing fails after the first tag in the compound, the second tag is ignored and no paths are copied to the path log 70-2. When a working path is ready to be copied back into the path log 70-2 a quick check is made to determine whether the phrase parsing module 40-2 has any chance of extending the path when the next batch of input tags is received from the dictionary module 10. If there is no chance, the path is not copied into the log. This saves memory (by leaving the path log area free for paths that have chances of continuing) and saves time (since there will be one fewer path to process when the next batch of tags arrive from the dictionary module 10).

When the working path 70-1 is to be copied back into the log at a new location, it may be (in complex sentences) that all paths are marked as active (states (1) and (2) above). In this case, special logic is invoked to select an active path that will be overwritten by the working path. This logic looks first for a path with more parsing errors (uses of "bad rules") than other paths. If one or more paths have more errors than the others, the first such path in the log is selected. If all paths have the same number of errors, then the special logic searches for a path that has a greater nesting depth than others. If one or more paths have greater nesting than others the first such path in the log is selected. The net effect of this logic is that when there are more paths generated by the grammar modules than can be handled in the memory available for the path log 70-2, the system 1 retains those paths having the fewest errors and the simplest grammatical structure. This has been found empirically to maintain the "true" path or paths even when some paths must be dropped to minimize time and memory requirements. (Nesting depth is discussed below in connection with the sentence checking module 40-4.)

Figure 3B:
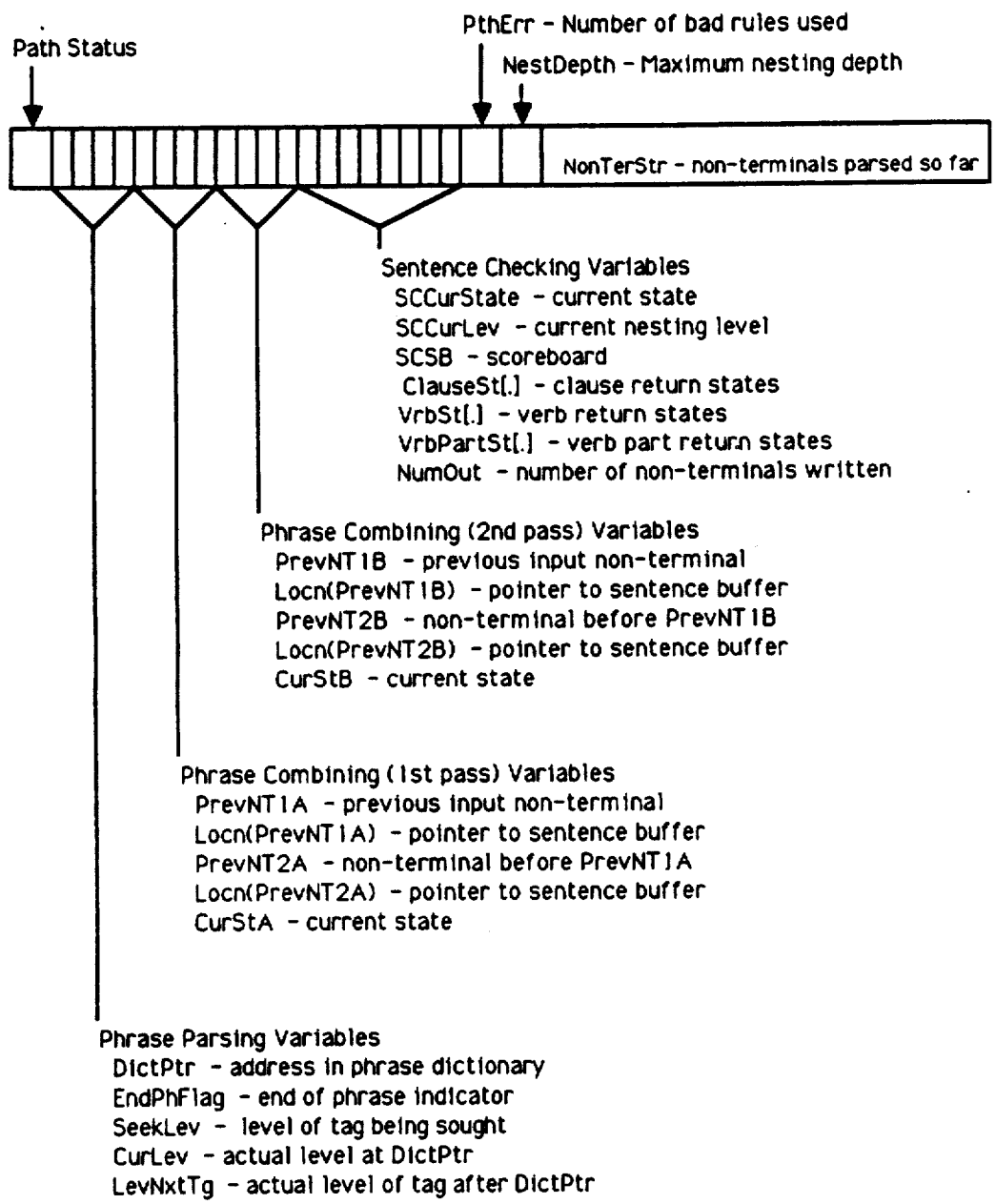
FIG. 3b is a schematic diagram of the process variables comprising a grammar path.

The contents of each grammar path are illustrated in FIG. 3b, showing path status and other variables (as already described) related to the status of operations in the grammar modules. Variables for both maximum-nesting-depth and number-of-bad-rules-used are maintained as part of each grammar path.

When all paths have been processed through the path extension module 40-1, there will be no paths of state (1) (active and waiting for processing) remaining in the path log 70-2. The path extension module then counts the number of paths of state (2) (active and processes) and the number of state (2) paths having zero parsing errors (i.e., no uses of "bad" rules). If there are no paths of state (2) or all paths of state (2) have one or more errors, then the path extension module signals the word processor that the input text contains a grammatical error. If there are no paths of state (2) (with or without errors) then the path extension module sets a flag to deactivate the sentence checking module 40-4 for the remainder of the sentence (however, the phrase parsing and phrase combining modules will continue to run) and creates one path in the path log that has been reset. As described below, the sentence checking module 40-4 cannot function for the remainder of the sentence when there are no paths of state (2), since it requires a contiguous stream of non-terminals from the beginning of the sentence and no such sequence could be found in the input text. If all paths of state (2) have errors, the sentence checking module runs so that grammar help can be given later if requested.

After counting the number of paths of state (2), the path extension module 40-1 sets all paths of state (2) (active and processed) to state (1) (active, waiting for processing) to be ready for the next batch of tags input from the dictionary 10. This concludes the activity of the grammar modules 40 for a given input word. At this point control returns to the word processor which obtains more characters from the user for input to the dictionary module 10.

Besides managing the operation of the other grammar modules, the path extension module 40-1 helps to minimize the number of grammatical rules needed in the grammar tables 50, thereby reducing the memory requirements of the parsing system 1, by examining the syntactical tags input to the grammar modules and mapping those syntactical tags to another, slightly different set of tags used in the phrase parsing module 40-2. The mapping carried out by the path extension module 40-1 is advantageous because the syntactical tags for a given entry in the dictionary 20 are assigned strictly based on the entirety of grammatical functions the given entry can play. Nevertheless, many of these syntactical tags have overlapping functions which, in appropriate circumstances, allow the overlapping tags to be combined. For example, the syntactical tags NCOM (for a common noun) and NMAS (for a mass noun) can both properly be preceded by the syntactical tag THE (for the definite article). Included in Table III is a list of eleven translated tags which are used in the phrase parsing module 40-2 but are not associated with entries in the dictionary 20. These eleven translated tags replace twenty-six different syntactical tags from the dictionary as shown in the Table. Syntactical tags not listed in Table III are used directly by the phrase parsing module 40-2 without mapping.

The tag translation carried out by the path extension module 40-1 can be appreciated by considering the translated tag XZBN (associated with past participle verb forms) that is produced by the path extension module 40-1 when the syntactical tags BEN or VBN are input from the dictionary module. Without this translation, the grammatical rules common to BEN and VBN would have to be stored twice in the phrase dictionary 50-1: once for BEN, and once for VBN. In this way, memory is conserved and processing is quickened.

Phrase Parsing

The phrase parsing module 40-2 groups sequences of syntactical tags from the dictionary module 10 as translated by the path extension module 40-1 into phrases or non-terminals which serve as inputs to the phrase combining module 40-3 and sentence checking module 40-4. Each sequence of syntactical tags is compared to entries in a phrase dictionary 50-1 in Which groups of tags are associated with non-terminals. The input to the phrase parsing module 40-2 is a single syntactical or translated tag and the working path 70-1 that includes the variables describing the current status of the phrase parsing process. The phrase parsing module 40-2 attempts to extend the working path with the tag, i.e., it attempts to move to another position in the parsing "maze".

Any of three outcomes can occur as a result of processing an input tag in the phrase parsing module:

(1) no extension is possible, i.e., the phrase described by the variables in the working path 70-1 cannot be extended with the input tag;

(2) an extension is possible but the phrase produced by extending the working path with the input tag is not complete, i.e., a non-terminal has not been found in the phrase dictionary 50-1; or (3) an extension is possible and the phrase produced by extending the working path with the input tag is complete, i.e., a non-terminal has been found in the phrase dictionary.

In constructing the phrase dictionary 50-1, sequences of syntactical tags are associated with or mapped onto individual non-terminals. For example, a few of the approximately 225 tag sequences which map onto the non-terminal $nbs (i.e., a singular noun phrase that can be a subject or an object) are the following:

| tag sequence | possible English equivalent |
|---|---|
| ZZD ONE HYPH NAMN NAMN | (the one-foot board) |
| ZZD NUMS HYPH NAMN NAMN | (your three-inch ruler) |
| ZZD ADJR CC2 ADJR NAMN | (a bigger and better idea) |
| ZZD ADJR NAMN | (the darker color) |
| ZZD ADJR NAMN NAMN | (a better automobile engine) |
| ZZD ADJR XVAJ NAMN | (a longer mailing list) |
| ZZD ADJT CC2 ADJT NAMN | (the biggest and brightest light) |
| ZZD ADJT NAMN | (his best attempt) |
| ZZD ADJT NAMN NAMN | (their earliest instruction manual) |
| ZZD ADJT XVAJ NAMN | (the smallest open window) |

It will be understood that the tag sequences shown above reflect the translation process performed by the path extension module 40-1. For storage in the phrase dictionary 50-1, the syntactical and translated tags in each sequence are conveniently represented by a sequence of one-byte data words, the last of which is arranged to have its most-significant-bit at logic HIGH. Each sequence of data words is then followed immediately by a one-byte word representing the associated non-terminal.

To minimize the memory needed for the phrase dictionary 50-1, the tag sequences and associated phrases or non-terminals are organized by a suitable packing technique. In one such packing scheme, the phrases are first grouped according to the first data word in each phrase and each group is sorted into numerical order. The list of phrases is then compressed by "factoring" out common data words, thereby removing redundancies. Finally, a vector table is produced which indicates offsets from the beginning of the phrase dictionary 50-1 at which phrases beginning with each tag are located. The offsets are simply indexed in the vector table according to the data words representing each initial tag and they include a special offset for those tags which cannot properly begin a phrase.

For example, factoring the ten phrases in the example above gives the following packing sequence:

( ZZD ( ADJR (CC2 ADJR NAMN $nbs NAMN $nbs ( NAMN $nbs
) XVAJ NAMN $nbs ) ADJT (CC2 ADJT NAMN $nbs NAMN $nbs (

```
NAMN Snbs ) XVAJ NAMN Snbs ) ONE HYPH NAMN NAMN Snbs
NUMS HYPH NAMN NAMN Snbs ))
``` assuming that the numerical values of the data words are assigned in an order that corresponds to the alphabetical order of the tag mnemonics. In reality, there are many more phrases beginning with ZZD, both for the non-terminal Snbs and other non-terminals. All the phrases beginning with ZZD would be grouped together by the sorting process, independently of the non-terminal associated with them. It can be seen from the packing in the above ten-phrase example that only about thirty-five bytes of memory are needed rather than the fifty-two bytes that would be necessary without packing. The small amount of extra memory needed for the vector table can be ignored for comparison purposes. Even better memory utilization is actually achieved in practice because of the greater redundancy in the full complement of tag sequences stored in the phrase dictionary 50-1.

Figure 5A:
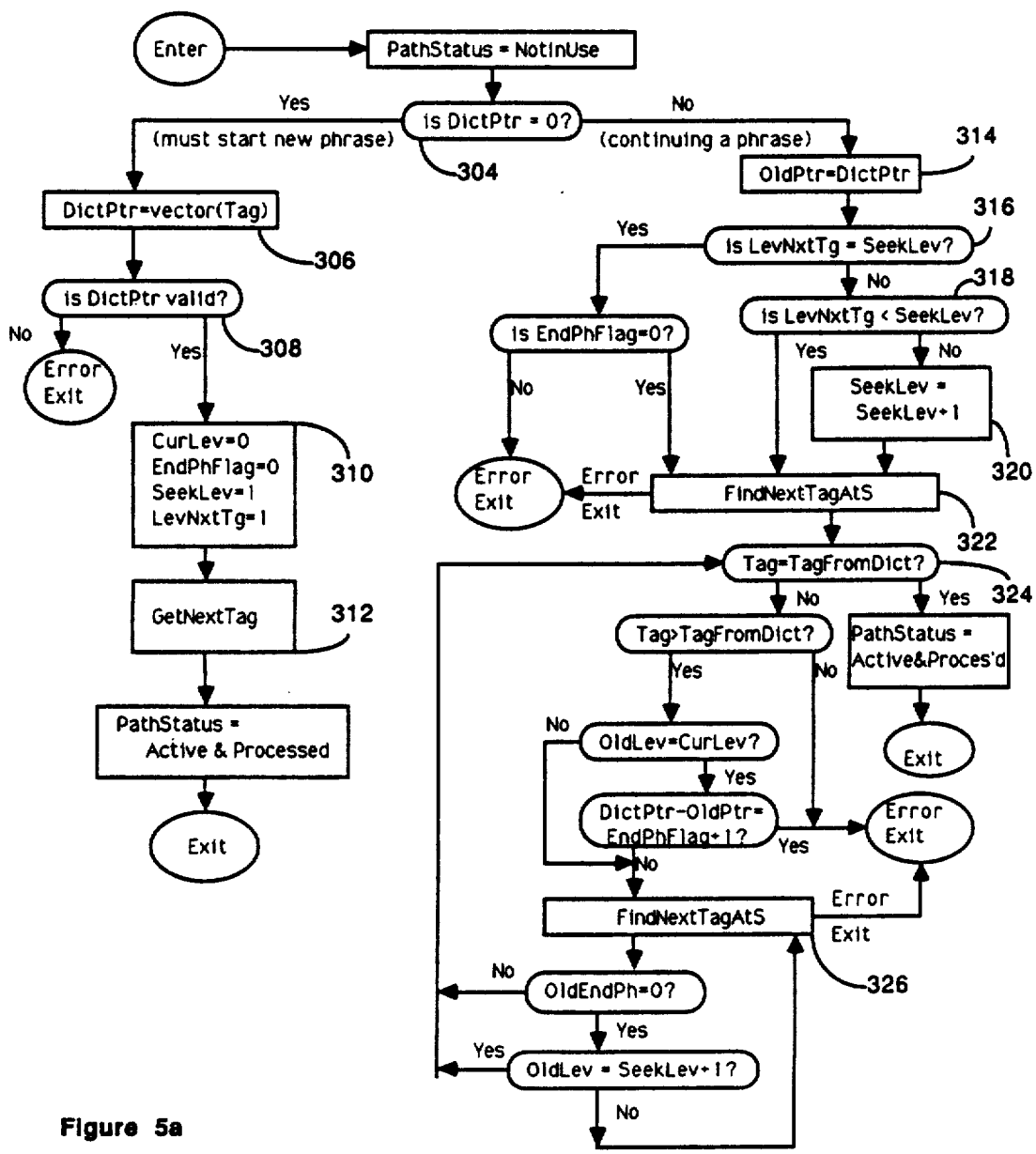
FIGS. 5a, b, and c are flowcharts of the operation of the phrase parsing module and phrase dictionary of the present invention.

FIGS. 5a, b, and c show in detail the process used by the phrase parsing module 40-2 to search the phrase dictionary 50-1. The "levels" referred to in the Figures and the following description indicate the net number of left parentheses that have been seen; thus, in the above example, ZZD is at level 1, the first instance of ADJR is at level 2, and both instances of CC2 and XVAJ are at level 3. The variables included in each grammar path that are relevant to the phrase parsing process are:

| | |
|---|---|
| DictPtr | a memory address somewhere in the phrase dictionary 50-1; |
| EndPhFlag | flag indicating that the end of a phrase was encountered in the phrase dictionary and a non-terminal was found; |
| SeekLev | these three variables are used to |
| CurLev | track levels in the |
| LevNxtTg | phrase dictionary packing scheme. |

Additional temporary variables OldPtr, OldLev, OldEndPh, NewNonTerm, and tmp are used in the operation of the phrase parsing process but are not included in the grammar paths.

Figure 5B:
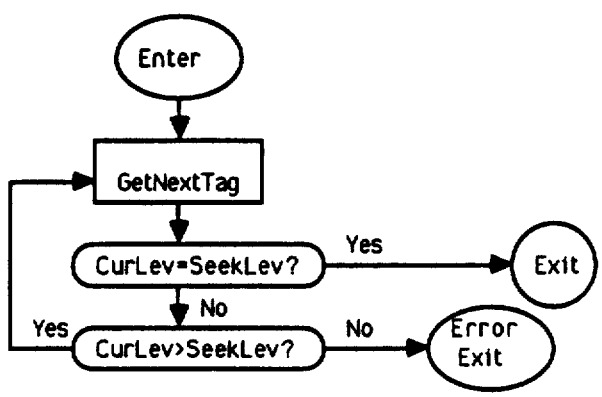

FIG. 5a is the highest view of the process carried out by the phrase parsing module 40-2. It references two subroutines (GetNextTag and FindNextTagAtS) that do the actual searching of the phrase dictionary 50-1. FindNextTagAtS (FIG. 5b) searches from a given point (DictPtr) looking for the next tag in the phrase dictionary at the level SeekLev. When processing of a new phrase begins, the Variable SeekLev is initialized to one, as shown on the left side of FIG. 5a (step 310), associating the first tag in a phrase with the level 1. The variable SeekLev is generally incremented by one for each subsequent tag in the phrase, as shown on the right side of FIG. 5a (steps 314-320), associating the second tag with level 2, the third tag with level 3, and so forth. For the example given above, if the tag ZZD has already been processed and is followed by an input of the tag ONE, FindNextTagAtS will be used two times (steps 322 and 326) with a SeekLev of 2 to skip the variable DictPtr so that the program moves from its starting position in the phrase dictionary (looking at the tag ADJR) via step 322 to an intermediate position (looking at the tag ADJT) at level 2 and then via step 326 to the final position (looking at the tag ONE).

Figure 5C:
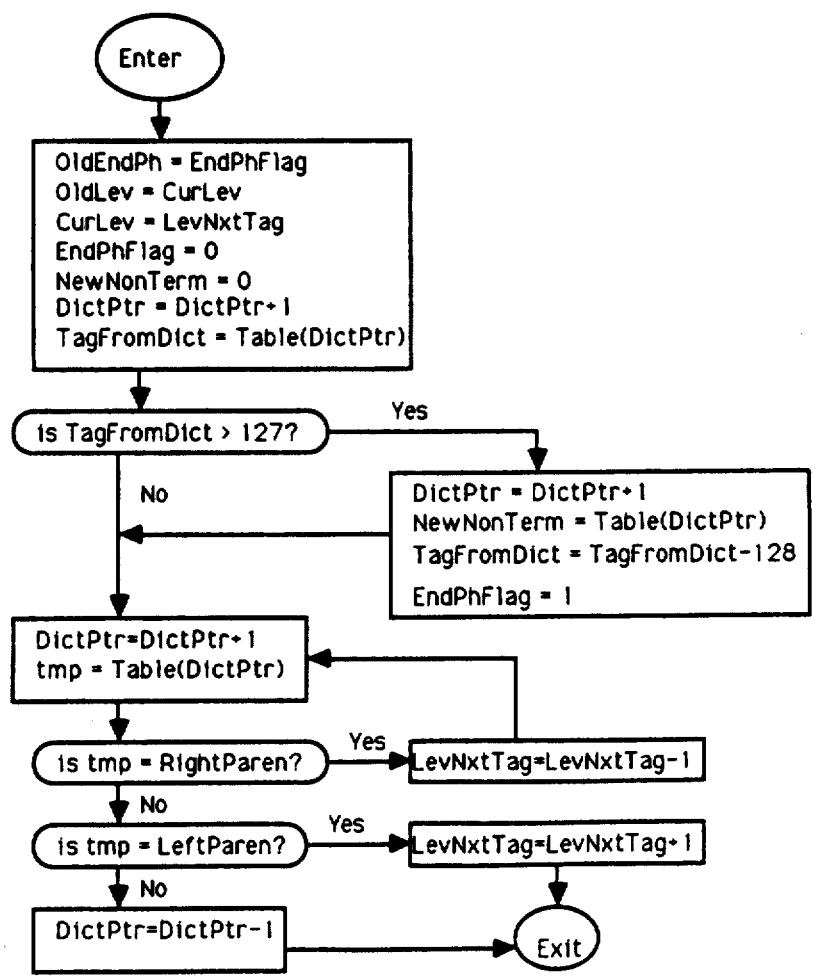

FindNextTagAtS repeatedly calls the routine GetNextTag (FIG. 5c) to examine intervening bytes and adjust the current level CurLev until the current level equals the SeekLev or until the current level is less than the SeekLev (the error case in which there are no more entries in this segment of the dictionary at the requested level.) The matching to determine if the input tag can extend the current position happens in FIG. 5a in two places.

On the left side of FIG. 5a, when a new phrase is to be processed (step 304), the variable DictPtr is set to an offset in the vector table that corresponds to the first tag of the input phrase (step 306). If that value of DictPtr is valid, i.e., if the first input tag matches one of the tags which can begin a valid phrase (step 308), the operation of the phrase parsing module proceeds to initialize the other relevant grammar path variables (step 310). On the right side of FIG. 5a, the steps prior to step 322 establish the correct SeekLev. The first call of the subroutine FindNextTagAtS (step 322) retrieves a tag from the phrase dictionary 50-1 that is then matched to the next input tag in the decision step 324: "Tag=TagFromDict?" If the input tag matches the tag retrieved from the phrase dictionary the working path is converted to active-and-processed status. Otherwise, the logic surrounding and including step 326 searches forward in the phrase dictionary to the next potential match, at which time control returns to step 324 and the process repeats until a match is found or until the logic determines that no match exists in the phrase dictionary.

A fundamental aspect of the present approach is that the subroutines return successively all the tags that can extend the current position, i.e., all the entries in the phrase dictionary 50-1 that begin with the tag or tags already input are examined. If one of those tags found in the phrase dictionary matches the input tag, then the input tag can extend the current position.

Phrase Combining

The input to the phrase combining module 40-3 is the working path 70-1 and a single non-terminal, output by the phrase parsing module 40-2. The phrase combining process compresses strings of non-terminals into higher non-terminals, i.e., those representing larger phrases; such higher non-terminals represent combinations of parts of speech with conjunctions and commas, and combinations of prepositions with their object noun phrases, among others. Additional examples of the phrase combining process are:

```
singular-noun-phrase, and, singular-noun-phrase =
  plural-noun-phrase;
singular-noun-phrase, or, singular-noun-phrase =
  singular-noun-phrase;
singular-present-verb, and/or, singular-present-verb =
  singular-present-verb; and
preposition, singular object = prepositional-phrase.
```

The phrase combining process implemented in the phrase combining module 40-3 is preferably carried out twice in bootstrap fashion to yield more highly compressed non-terminals. For example, in a first pass through the phrase combining process, noun-phrases joined by a conjunction can be combined, forming another noun phrase which itself can be combined with a preposition to form a prepositional phrase in a second pass.

Figure 6A:
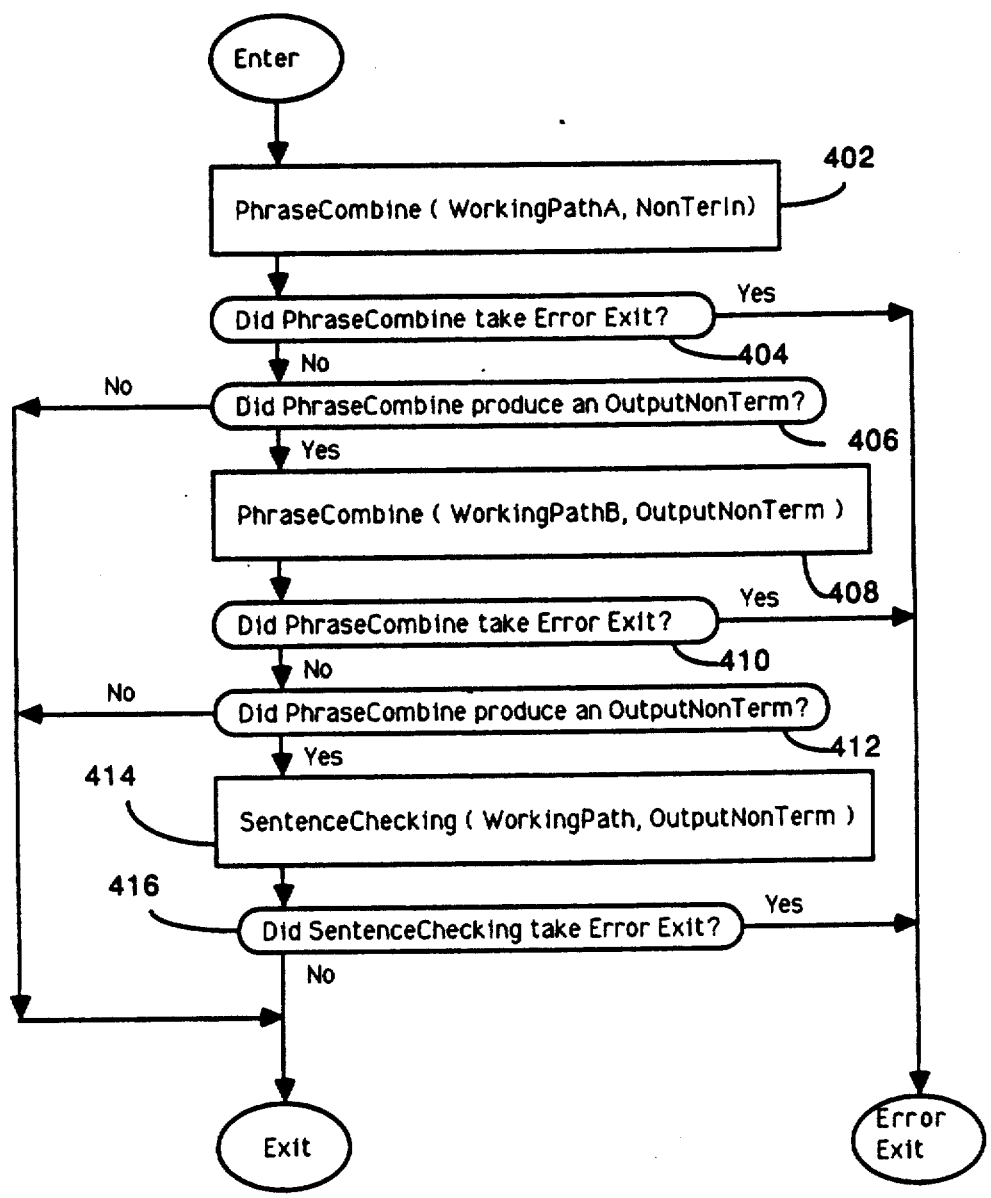
FIGS. 6a and b are flowcharts of the operations of a phrase combining module in accordance with the present invention.

This process is illustrated in the flowchart of FIG. 6a. In the Figure, the scheduling of two passes through the phrase combining process (steps 402 and 408) and one pass through the sentence checking process (step 414, described in more detail below) of a working path is shown. It can be noted that the variable WorkingPathA referred to in the flowchart is the area of the working path containing the variables PrevNT1A, PrevNT2A, and CurStA and that the variable WorkingPathB is the are of the working path containing the variables PrevNT1B, PrevNT2B, and CurSt B. The input to the first pass through the phrase combining process (step 402) is WorkingPathA and a single non-terminal NonTerIn. During each pass, if that process takes an error exit (steps 404, 410 and 416), any subsequent passes are aborted and that working path is designated a bad path. On the other hand, when a pass through phrase combining is valid but no output to a following process is produced (steps 406 and 412), the processing of the working path is complete, the working path is designated a valid path, and the system advances to process the next grammar path in the path log.

As a specific example of the bootstrapping phrase combining process, consider the input phrase:

*in your car or his.*

The phrase parsing module 40-2 thus outputs to the phrase combining module 40-3 the sequence of non-terminals:

*Sin, Snbs, Sor, Snbb.*

In the first pass, the phrase combining process produces the sequence of higher non-terminals:

*Sin, Snbb.*

The second pass through the phrase combining process produces the single non-terminal:

*Spp* which is then output to the sentence checking module 40-4. It will be appreciated that additional passes through the phrase combining process can be carried out, but two passes are sufficient to compress most styles of written English.

In the present embodiment, the phrase combining process is implemented as a finite state process or filter having 63 states, each representing a condition in which a predetermined sequence of non-terminals is input from the phrase parsing module 40-2. Associated with each state is a list of non-terminals which may be input next and actions to be taken for each next input. It will be appreciated that finite state processes are well-known to those of ordinary skill in the art, although the present embodiment carries out the necessary processing with minimal memory and time expenditures.

As already mentioned, each state of the finite state process implemented in the phrase combining process is described by a list of pairs stored in the lookup table 50-2. The first element of each pair is a non-terminal which may be input next from the phrase parsing module 40-2 or from the first pass through the phrase combining process. The second element of each pair is an action to be taken when the first element is in fact the next input. The actions which can be taken on input of a given non-terminal are:

(1) change to another predetermined state;
(2) output a predetermined non-terminal and then reset this filter;
(3) output the input non-terminal and reset this filter;
(4) output both the previous and current input non-terminals and reset this filter;
(5) output the two previous and one current input non-terminals and reset this filter;
(6) drop this path (this is error return; bad path);
(7) reset this filter without any output;
(8) output prepositional phrase followed by the current input non-terminal; and
(9) reset this filter and then reprocess the current input.

Figure 6B:
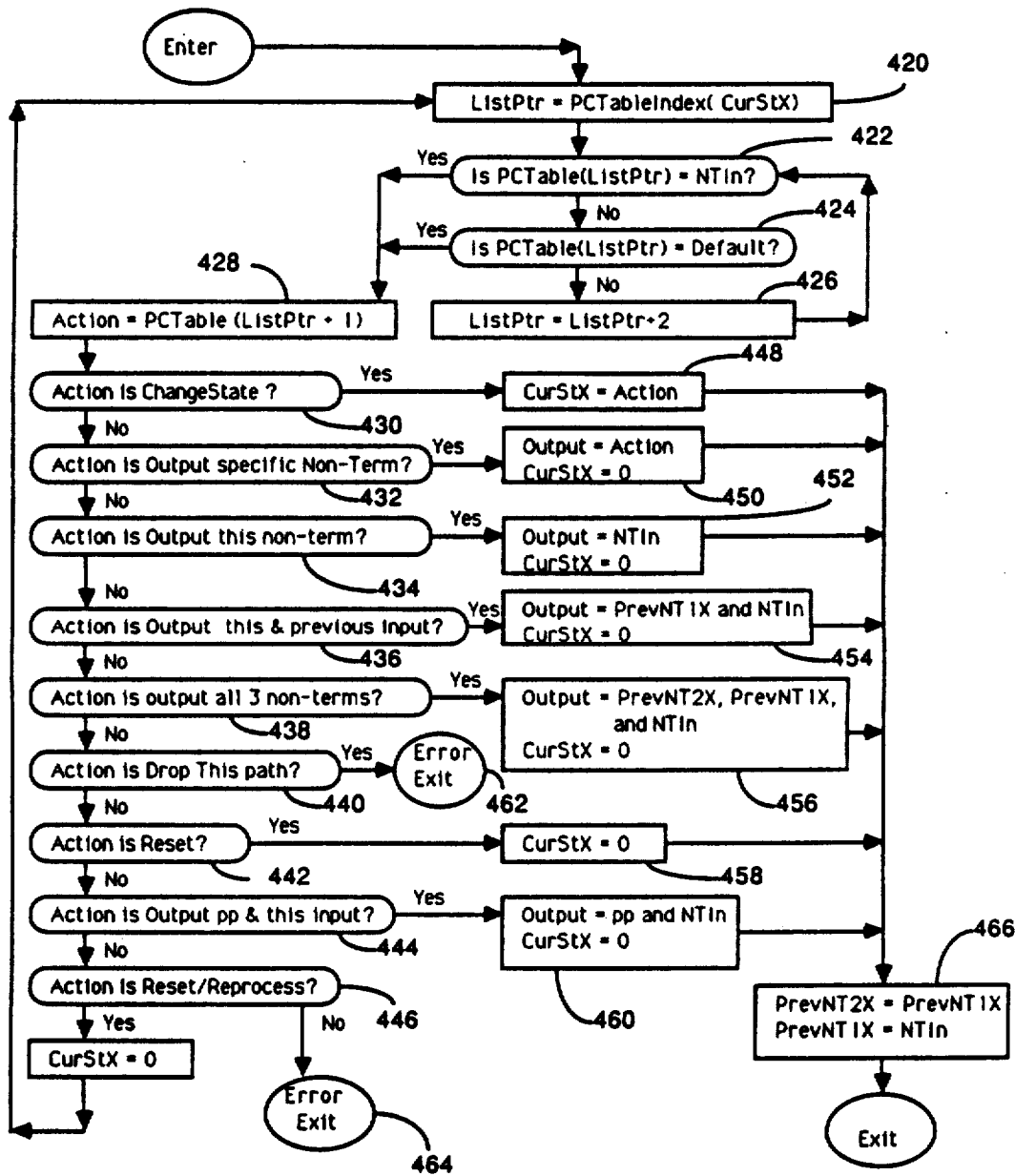

In addition, at least one pair in the list for each state includes as a first element a special default code to handle situations in which a non-terminal is input that does not match any of the other non-terminals on the state's list. FIG. 6b shows a flowchart of the process carried out in a single pass by the phrase combining module 40-3. In the process the following variables, included as part of each grammar path, are manipulated:

for the first pass:

| PrevNT1A | previous input non-terminal; |
|---|---|
| Locn(PrevNT1A) | position in the sentence buffer 60 at which PrevNT1A ends; |
| PrevNT2A | non-terminal input before the previous one (PrevNT1A); |
| Locn(PrevNT2A) | position in the sentence buffer 60 at which PrevNT2A ends; |
| CurStA | current state for first pass; | for the second pass, these variables become:

| PrevNT1B | previous input non-terminal; |
|---|---|
| Locn(PrevNT1B) | position in the sentence buffer 60 at which PrevNT1B ends; |
| PrevNT2B | non-terminal input before the previous one (PrevNT1B); |
| Locn(PrevNT2B) | position in the sentence buffer 60 at which PrevNT2B ends; |
| CurStB | current state for the second pass. |

The sentence buffer position variables (e.g., Locn (PrevNT1A) are not shown explicitly in the flowchart of FIG. 6b for clarity, but they are to be considered as accompanying the non-terminal variables (e g., PrevNT1A). In addition, it will be appreciated that when non-terminals are combined by the phrase combining process, the location in the sentence buffer 60 at which the input words corresponding to the combination end is conveniently and advantageously just the position variable of the last non-terminal in the combination.

In the flowchart, the pointer ListPtr indexes the pairs associated with each state and stored in the phrase combining lookup table 50-2. ListPtr is initialized (step 420) to another variable PCTableIndex whose value is set by the path variable CurStX, where X is one of A and B (areas in WorkingPath), describing the current pass of the phrase combining process. The program variable PCTableIndex is thus set by the CurStX path variable to the location in the phrase combining lookup table 50-2 at which is stored the beginning of the list of pairs describing the current state.

If the input non-terminal NTIn does not match the non-terminal which is the first element of the first pair on the list (step 422), the program determines whether that element is the default code (step 424). If the default code is not encountered, the pointer ListPtr is incremented by two (step 426) and the next entry on the state list is compared to the input non-terminal NTIn. Eventually, the input non-terminal is matched to either the default code or a non-terminal on the state list (step 422) in which case the pointer ListPtr is incremented by one (step 428) to access the location in lookup table 50-2 where the action to be carried out when that particular non-terminal is input is stored. Which of the nine possible actions (steps 430-446) is carried out (steps 448-464) is then determined in the remainder of FIG. 6b, and the non-terminal variables for the second pass through the phrase combining process are initialized (step 466).

Sentence Checking

The sentence checking process resembles one pass through the phrase combining process in that at each point during sentence checking the system is in one of a plurality of possible states, each of which is associated with a list specifying an action to be taken by the system for each non-terminal input to the sentence checking process. Nevertheless, the possible actions to be taken by the sentence checking system are more complex than those taken by the phrase combining system.

The list associated with each state of the sentence checking system is basically one of triples, i.e., each list entry is arranged as: input-non-terminal, next-state, action. With a few exceptions, if the non-terminal input to the sentence checking module 40-4 is not found in the list for the present state, the grammar path producing that input non-terminal is dropped. The exceptions to this rule that are useful in processing English are that if an adverb or idiomatic prepositional phrase is not found in the list, the sentence checking system remains in its current state without taking further action. Another exception is that if the grammar modules 40 are processing an embedded clause, or nested segment, and no transition words are found, the system returns to processing the immediately higher nesting level, i.e., it un-nests by one level, and attempts to find a valid sentence checking rule or list entry for the state at that level.

In constructing the sentence checking rule table 50-3 a plurality of states are defined that represent possible parsing conditions and a list of triples is associated with each state. The triples are "good" sentence checking rules. For "bad" rules, fourth entries are added that denote error types. Table IV lists actions and error types specified in the entries on the lists in table 50-3. Each rule includes a specified input non-terminal and a next state for the sentence checking process, although the inclusion of an action and error-type is optional. The inclusion of an action is needed only to handle certain situations, such as those involving nesting and subject-verb checking (e.g., that every verb has a subject) while the inclusion of an error-type is needed only when grammar help is to be provided.

It will be understood that many of the sentence checking rules are embedded in how the parsing system changes from state to state in the rule table 50-3 and in which actions are performed in a given state. For example, an embedded action may be not having to check subject-verb agreement in a given state.

The sentence checking process always begins in a first state, conveniently denoted SOM ("start of message"). A partial list of the rules associated with the state SOM is given in Table V. The first five rules listed in the table provide that five different kinds of subject lead to five different states, although for those states the same action is carried out. To the right of each rule in the Table (e.g., nbp NBP :[ss]) is a sample sentence or sentences that might use the rule. For each sample sentence listed in the Table, the portion in brackets represents the segment of the sentence that produces the non-terminal in the rule. It can be noted that the last rules listed in Table V that indicate a missing-subject error-type are appropriate for an English language parsing system. The Spanish language, for example, permits a subject to be established explicitly in the beginning of a paragraph and then to be omitted from later sentences.

In accordance with the present invention, the lookup table 50-3 is packed for use by the sentence checking module 40-4 by representing each input-non-terminal, next-state, action, and error-type as a one byte code with a value less than or equal to 127. There are other ways to pack the sentence checking lookup table but using single bytes is particularly memory efficient. The rules for a given state are grouped together in memory and listed in no particular order, although the last byte in each rule has 128 added to it (i.e., the eighth bit of the last byte is set). This flags the end of one entry on the list and thus indicates the beginning of the next. The end of the list for each state is conveniently flagged by including as the last entry in the list a rule having an impossible non-terminal value in a manner somewhat analogous to the effect of the default code employed in the phrase combining process. The lists for all the states are then concatenated (SCTable in FIG. 7a) and an indexing table (SCIndex) is constructed that indicates where the list for each state begins in the lookup table 50-3.

Because of the nature of some of its actions, the sentence checking module 40-3 and table 50-3 do not constitute a finite state process. As discussed below, some of the actions result in saVing the current state for later use and jumping to a new point in the table to handle particular grammatical constructs. Such a detour with return to the previous state is called nesting. Because of this, the sentence checking system resembles a context-free grammar (or context-free parser), however, strictly speaking, the present embodiment is not context-free. The formal definition of context-free operation requires infinitely many levels of nesting, but only two levels are permitted in the present embodiment. For the theoretical background of finite-state systems and context-free grammar, see Chomsky, Noam, *Aspects of the Theory of Syntax*, Massachusetts, MIT Press, 1965, and Hopcroft, John, et al., *Formal Languages and Their Relation to Automata*, Massachusetts, Addison-Wesley, 1969.

The variables included in each grammar path that are manipulated by the sentence checking system are:

| | |
|---|---|
| SCCurState | the current state in the sentence checking process; |
| SCCurLev | the current nesting level (0,1, or |

| | -continued |
|---|---|
| | 2); |
| SCSB | the "scoreboard" which records the presence or absence of a subject and verb at each nesting level; |
| ClauseSt[1] | the state to return to when finished with a nested clause at level 1; |
| ClauseSt[2] | the state to return to when finished with a nested clause at level 2; |
| VrbSt[0] | the state to jump to when another verb is found at level 0; |
| VrbSt[1] | the state to jump to when another verb is found at level 1; |
| VrbSt[2] | the state to jump to when another verb is found at level 2; |
| VrbPartSt[0] | the state to jump to when a repeated second part of a verb is found at level 0; |
| VrbPartSt[1] | the state to jump to when a repeated second part of a verb is found at level 1; |
| VrbPartSt[2] | the state to jump to when a repeated second part of a verb is found at level 2; |
| PthErr | number of "errors" ("bad" non-terminals or "bad" rules) used in the current path; |
| NestDepth | maximum nesting depth so far in the current path (0,1 or 2); |
| NumOut | number of non-terminals written in NonTerStr; and |
| NonTerStr | a string of the non-terminals processed so far in the current path, including "special" marks. |

Figure 7A:
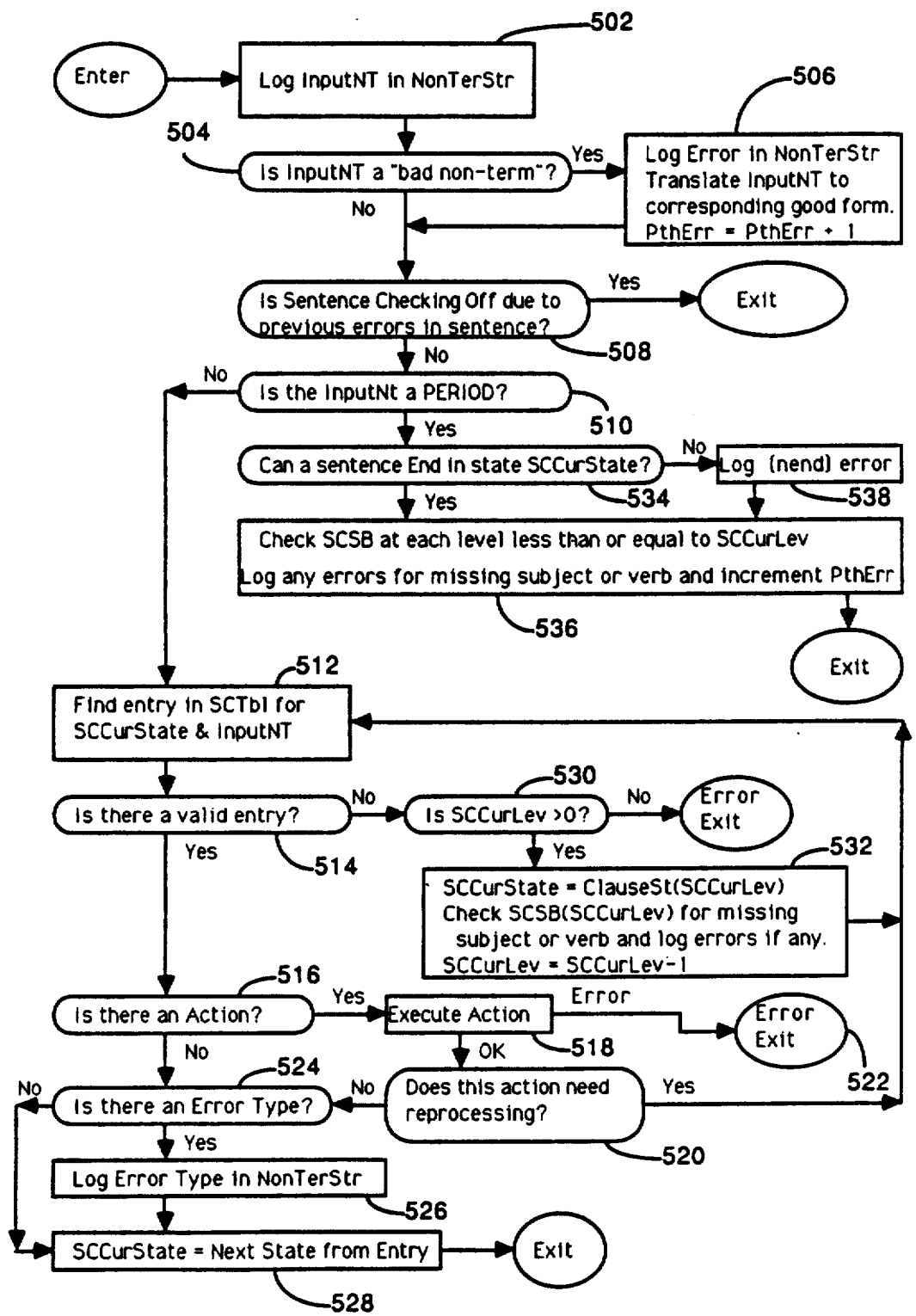
FIG. 7a is a flowchart of the operation of a sentence checking module in accordance with the present invention.

These variables and the process carried out by the sentence checking module 40-4 are illustrated in the flowchart shown in FIG. 7a. A non-terminal input from the phrase combining module 40-3 is first added to the string of non-terminals NonTerStr (step 502) that have already been processed in the current grammar path. If the input non-terminal is a "bad" non-terminal (step 504), e.g., one representing a "bad" singular- noun-phrase, it is translated to the corresponding "good" non-terminal, e.g., one representing a "good" singular-noun- phrase (step 506). A note is made in the non-terminal string that the input non-terminal is bad and the PthErr counter in the current grammar path is incremented. It will be recalled that if previous grammatical errors identified by the phrase parsing and combining processes resulted in no grammar paths of any type remaining, a flag was set by the phrase combining module 40-3. In this case, the sentence checking module 40-4 does no further processing on the current grammar path (step 508).

After the above-described checks have been completed, if the input non-terminal is not a period (step 510), the sentence checking module 40-4 finds the appropriate rule for the current state (SCCurState) and the input non-terminal (InputNT) in the rule table (SCTb1) 50-3 (step 512). When a valid rule is found in the rule table 50-3 (step 514), the sentence checking module carries out the appropriate action (steps 516 and 518), reprocessing the resulting path if required (step 520), or error exits (step 522). If there is no action in the selected entry in the rule table, or if there is no executable action needing reprocessing, the program determines whether an error mark is to be logged into the string of non-terminals (NonTerStr) (steps 524 and 526) and changes the state of the sentence checking process to that specified in the entry (step 528). When a valid rule is not found in the rule table 50-3 (step 514), the process checks the nesting level of the working path (step 530). If the current nesting level indicates that an embedded clause is being processed, the current state in the process is updated, the SCSB variable is checked and any subject-Verb errors logged in NonTerStr, and the current nesting level variable is decremented (step 532). Thus, as non-terminals are processed by the sentence checking module 40-4 they are added to NonTerStr.

In addition, selected actions included in the sentence checking rules cause other information to be added to NonTerStr for use in the grammar help process described below. Included in the other information are:

an indication of the location of the words in the sentence buffer that produced the input non-terminal, specified by the character count at which the non-terminal ends, special marks to indicate that the input non-terminal is a subject or verb at a specified level, indications that the input non-terminal was classed as a "bad" non-terminal by the phrase parsing module, and indications that a "bad" rule was used by the phrase parsing module to parse the input non-terminal.

This other information is only needed if the parsing system is configured to give grammar help as described in more detail below. If grammar help is not included the entire sentence checking processing relating to NonTerStr can be removed from the system.

As an example, consider the sentence: "He are." The phrase parsing and combining modules and sentence checking produce one path having the following non-terminal string in NonTerStr:

--- ns3 (location = 2) (Subject at levl 0) ber (location = 6) (Verb at levl 0) (Subject-Verb-Agreement-Err at levl 0) period (location = 6).

---

Thus the grammar help routine "knows" that there is a single subject-verb-agreement error in the sentence and that the subject extends from location 0 to location 2 and that the verb extends from location 2 to location 6 in sentence buffer 60.

Figure 7B:
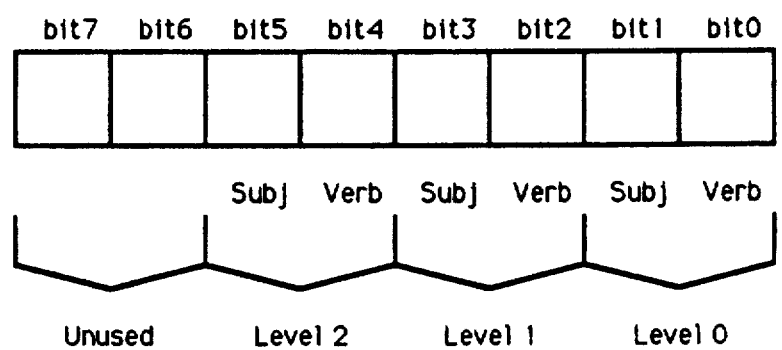
FIG. 7b is a block diagram of a sentence checking scoreboard used in the operation of the sentence checking module.

If the input non-terminal is a period (step 510) and the sentence can properly end in the state indicated by the grammar path variable SCCurState (step 534), the process carried out in the sentence checking module 40-4 checks the SCSB variable (step 536) otherwise an appropriate error-type ({nend}) is logged into NonTerStr (step 538). This variable, or "scoreboard," is advantageously configured as a single byte as shown in FIG. 7b. The status of each bit position indicates whether a grammatical entity, such as a subject or a verb, has or has not been seen in the construct represented by the grammar paths. The scoreboard therefore keeps track of the appearance of subjects and verbs at each nesting level. If the input text is "The bench in the park.", the scoreboard, when examined at the end of the sentence, will indicate that a subject was found, but no verb. Sentence checking will then generate a "missing verb" error.

Other variables manipulated by the sentence checking module are the following.

ClauseSt[.]

In a sentence like: "The show we liked the best was on TV last night.", the clause "we liked the best" is really a sentence within a sentence. The clause is parsed as level 1, while "The show was on TV last night" is parsed as level 0. When the parsing system sees the word "we," it sets ClauseSt[1] to the current state (the one it is in after "the show") and sets off to parse an entire sentence beginning with "we." When the non-terminal for the word "was" is input, the sentence checking module cannot add it to level 1 without generating an error. At that point the sentence checking system checks that level 1 has a valid subject and verb (it does) and then restores the state found in ClauseSt[1] to process the non-terminal generated by "was".

VrbSt[.]

For a sentence like: "The reporter writes his stories and files them promptly," the two words "writes" and "files" must agree with the subject "the reporter". When the sentence checking module sees the non-terminal representing "the reporter," it sets VrbSt[0] to the current state. When the second verb ("files") appears, the sentence checking system returns to the state in VrbSt[0] and processes the non-terminal that resulted from "files". This ensures that the second verb also agrees with the subject.

VrbPartSt[.]

For a sentence like: "The reporter has written his stories and given them to the editor," the two verb forms "written" and "given" must both be appropriate for following "has." When the sentence checking system sees the non-terminal for "has," it sets VrbPartSt[0]to the current state. When it sees the non-terminal for "given", it returns to the state in VrbPartSt[0] to process the second verb part. This ensures that "given" agrees with "has".

Figure 7C:
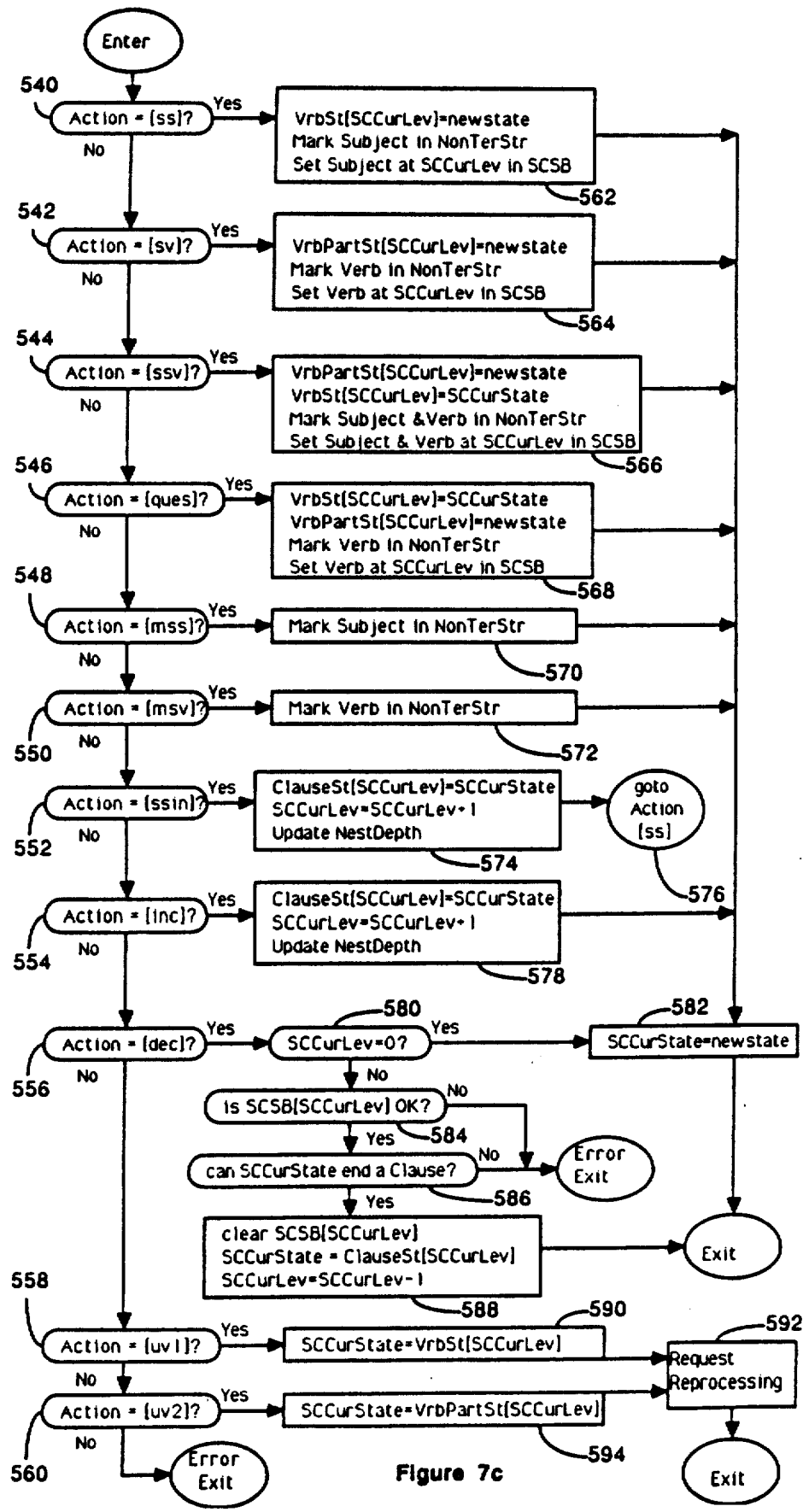
FIG. 7c is a flowchart of a portion of the operation of a sentence checking module in accordance with the present invention.

FIG. 7c shows a flowchart of the operation of the sentence checking module 40-4 relating to the representative actions listed in Table IV and included in the sentence checking rules of Table 50-3. Depending on which action is included in the rule being applied (steps 540–560), selected ones of the grammar path variables are manipulated and other actions carried out as shown during execution of the actions (steps 562–594).

Grammar Help

It will be appreciated that there are many possible modes of giving help with grammatical errors, such as suggesting one or more rephrasings of the sentence that are grammatically acceptable. The latter mode involves expenditures of memory and processing time that are larger than the mode selected for the present embodiment in which the words in the sentence that seem to contribute to the errors are simply indicated to the user.

As an example of the present embodiment, a subject-verb-agreement error as in the sentence:

*The memo you sent me were most helpful.* gives rise to a user prompt such as "Look again at these words: The memo were." Another advantage of this mode of giving grammar help is that, for educational applications of the present invention, users hypothesize their own corrections, thereby reinforcing their grammar skills. This mode also provides adequate help for adult native users of a language who can immediately deduce the necessary sentence revision from a prompt such as that above. Furthermore, in a grammar help system which itself suggests rephrasings, the example sentence would produce two suggestions, i.e., "the memo was" and "the memo were," because the system cannot "know" the meaning intended by the user. For more complex sentences, a large number of grammatically correct rephrasings can often be found, reducing the effectiveness of the help provided by a system which suggests rephrasings.

Most of the information manipulated by the grammar help module is provided by the sentence checking system in the latter's addition of special marks to the non-terminal string, NonTerStr. As described above, these special marks indicate the locations in a grammar path's non-terminal string of subjects, verbs, errors, and error-types. An important action of the grammar help system is simply to find in the path log 70-2 the grammar path or paths most likely to be useful in giving help and to translate that help from the non-terminal strings in those paths into prompts intelligible to the user.

Figure 8:
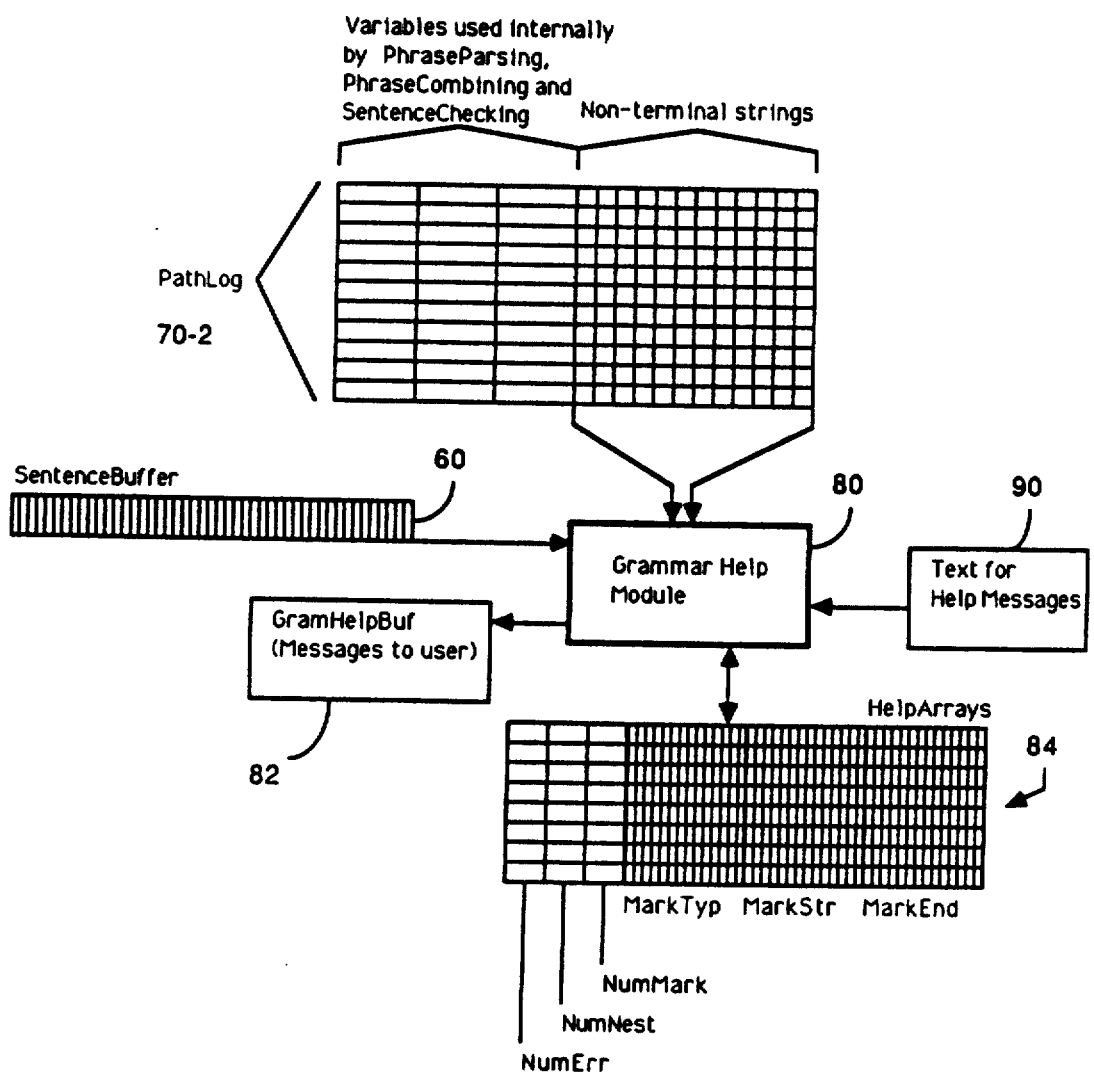
FIG. 8 is a block diagram of a grammar help portion of a parsing system in accordance with the present invention.

FIG. 8 shows the arrangement of the major data blocks employed in the grammar help system. The input to the grammar help system is the path log 70-2 as it has been processed through the grammar modules 40. An intermediate set of data, HelpArrays 84, contains a synopsis of information extracted from the non-terminal strings of the grammar paths in the path log 70-2. The grammar help output buffer 82, called GramHelpBuf, receives help messages translated for the user by the grammar help module 80 using explanations stored in the grammar help lookup table 90. The user's word processor or other external system then displays the contents of the buffer 82 to the user.

It will be appreciated that the precise format of the contents of GramHelpBuf 82 is not important to the present invention, since it depends on the manner in which the user's word processor displays information (number of lines available, number of characters per line, etc.). In general, it contains one of two types of messages:

(1) if grammar help is available, it contains an introductory phrase such as "Look again at these words:" followed by the various suggestions derived by the grammar help module 80; and (2) if help is not available (i.e., the error was so catastrophic that no paths remain in the path log 70-2), it contains an apology to the user such as "Sorry, no help is available."

The HelpArrays 84 contain the following information for each valid grammar path from the path log 70-2:

| | |
|---|---|
| NumErr | the total number of error marks in the path; |
| NumNest | the maximum nesting level for the path; |
| NumMark | the total number of subject, verb and error marks in the path; | and three lists of numbers to describe all the subject, verb, and error marks:

| | |
|---|---|
| MarkTyp[.] | the mark type (subject, verb, or error-type); |
| MarkStr[.] | the start location in sentence buffer 60; and |
| MarkEnd[.] | the end location in sentence buffer 60. |

The location values stored are the starting and ending character counts in the sentence buffer 60 for the non-terminal that produced the given error or subject/verb mark.

Figure 9A:
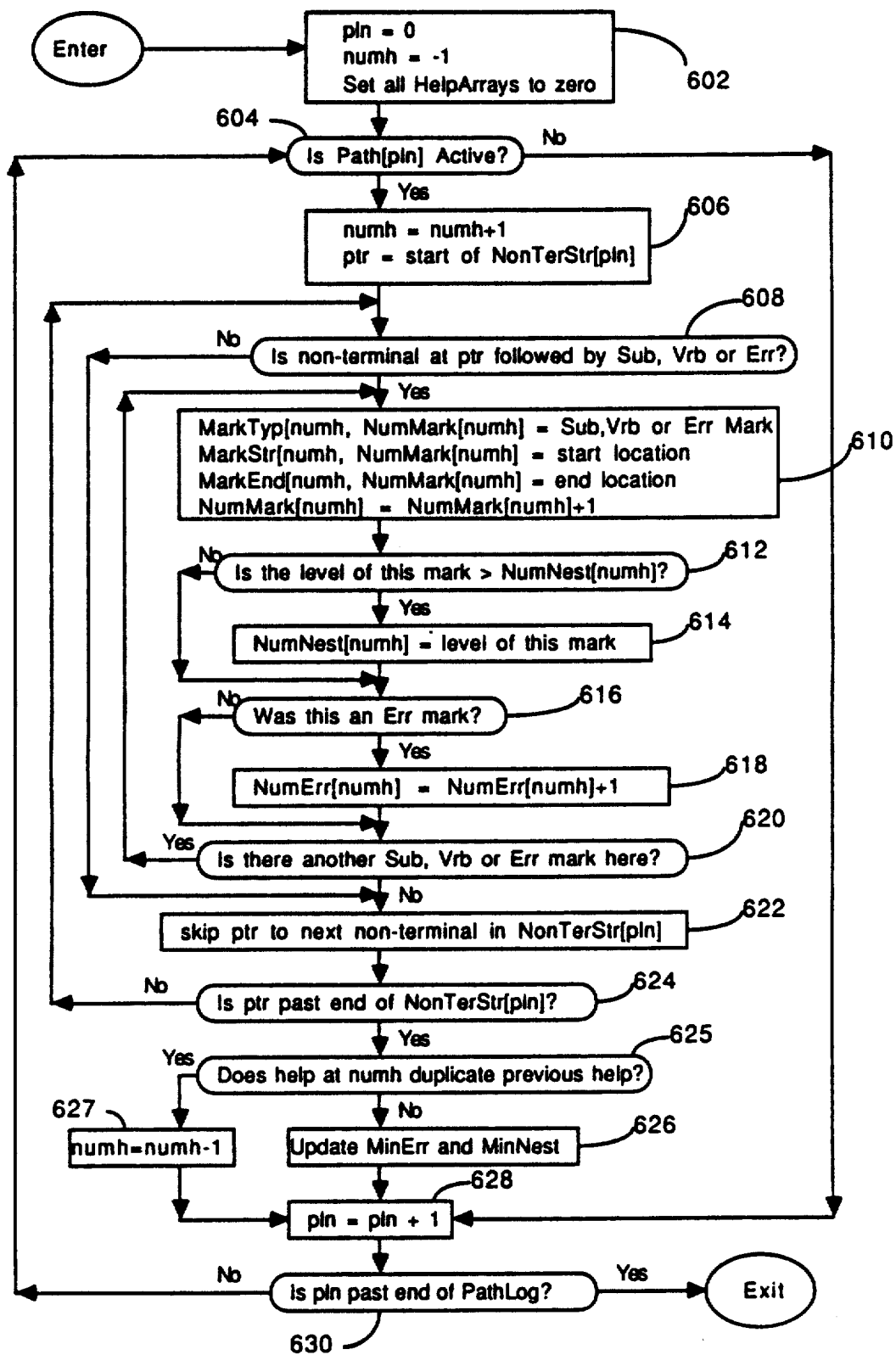
FIGS. 9a and b, are flowcharts of the operation of the grammar help portion of a parsing system in accordance with the present invention.

The process carried out in selecting paths from the path log 70-2 for help manipulation by the module 80 is illustrated by the flowchart of FIG. 9a. In the Figure, the processing of the active grammar paths and manipulation of variables are indexed with the counters pln and numh and the variable ptr which locates the memory position of the start of the string of non-terminals Non-TerStr included in each grammar path to be processed. In general, after initialization (step 602), the process translates information from all the active paths in the path log 70-2 to the HelpArrays 84 (steps 604-630) in order to condense the non-terminal strings in the paths to the precise information needed to give help. The HelpArrays 84 are created by the parsing system in the user's random access memory, using about 300-400 bytes. This memory allocation is based on the typical case in which a maximum of twelve paths are identified for help, each such path having a maximum of ten entries and each such entry needing a few bytes to describe it.

During the process of translating the non-terminal strings to the HelpArrays, duplicate information in the paths available for help is removed (steps 625-627). Duplication can occur because the arrays contain information on only subjects, verbs and errors but not the number of multiple simultaneous parses giving rise to those subjects, verbs and errors. For example, the sentence "He go to work." produces two grammar paths: one parses "to work" as an infinitive ("work" as a verb), the other parses "to work" as a prepositional phrase ("work" as a noun.) Both paths produce the same HelpArray entries indicating that "He" is the subject, "go" is the verb, and a subject-verb agreement error occurs at level 0.

Also during the translation, a note is made of the number of errors (NumErr) and maximum nesting level (NumNest) in each path (steps 610-620). The path(s) selected for help have an error count equal to the minimum number of errors per path found during translation (step 626). If there are several paths with this number of errors, then only those with the lowest value for nesting level (step 626) will be used. (This is the same special logic used by the path extension module 40-1 to select paths for retention when the phrase parsing module generates too many paths to fit in the path log.) Thus, help is given for the sentence parsings that show the fewest errors and simplest grammatical structure. This is desirable because the phrase parsing Module 40-2 can hypothesize many "bad" non-terminals for an actually grammatically valid input phrase.

As an example of the processing carried out by the grammar help system, consider the flawed sentence:

*The cat he lost were mine.*

The grammar modules 40 create two families of grammar paths for the example, i.e., a family in which the members have a single error of subject-verb-disagreement in the main clause (i.e., level 0) and a family in which the members have two errors in the main clause: a "bad" singular-noun-phrase and a subject-verb disagreement. The processing illustrated in FIG. 9a selects the grammar paths in the first family for grammar help since that family has the minimum number of errors.

As an example of the error number/nesting depth hierarchy implemented by the grammar help module 80, consider another flawed sentence:

*Time bombs frightens kids.*

The grammar modules 40 generate three possible parsings of that sentence:
(1) subject ("Time bombs")—verb ("frightens")—object ("kids"):
(2) subject ("Time")—embedded clause ("bombs frightens")—plural noun ("kids"): and
(3) subject ("Time")—embedded clause ("bombs frightens")—singular verb ("kids").

In parsings (2) and (3), the embedded clause is presumed to modify the subject. Parsing (1) includes one error of subject-verb-agreement in the main clause (nesting level 0). Parsing (2) includes two errors, one of a missing verb in the main clause and one of subject-verb-agreement in the embedded clause (nesting level 1). Parsing (3) includes one error of subject-verb-agreement in the embedded clause (nesting level 1).

The processing carried out by the grammar help module 80 considers both the number of errors and the maximum nesting depth in determining the parsing for which grammar help is provided. Thus, in the present embodiment, help is provided only for parsing (1).

Figure 9B:
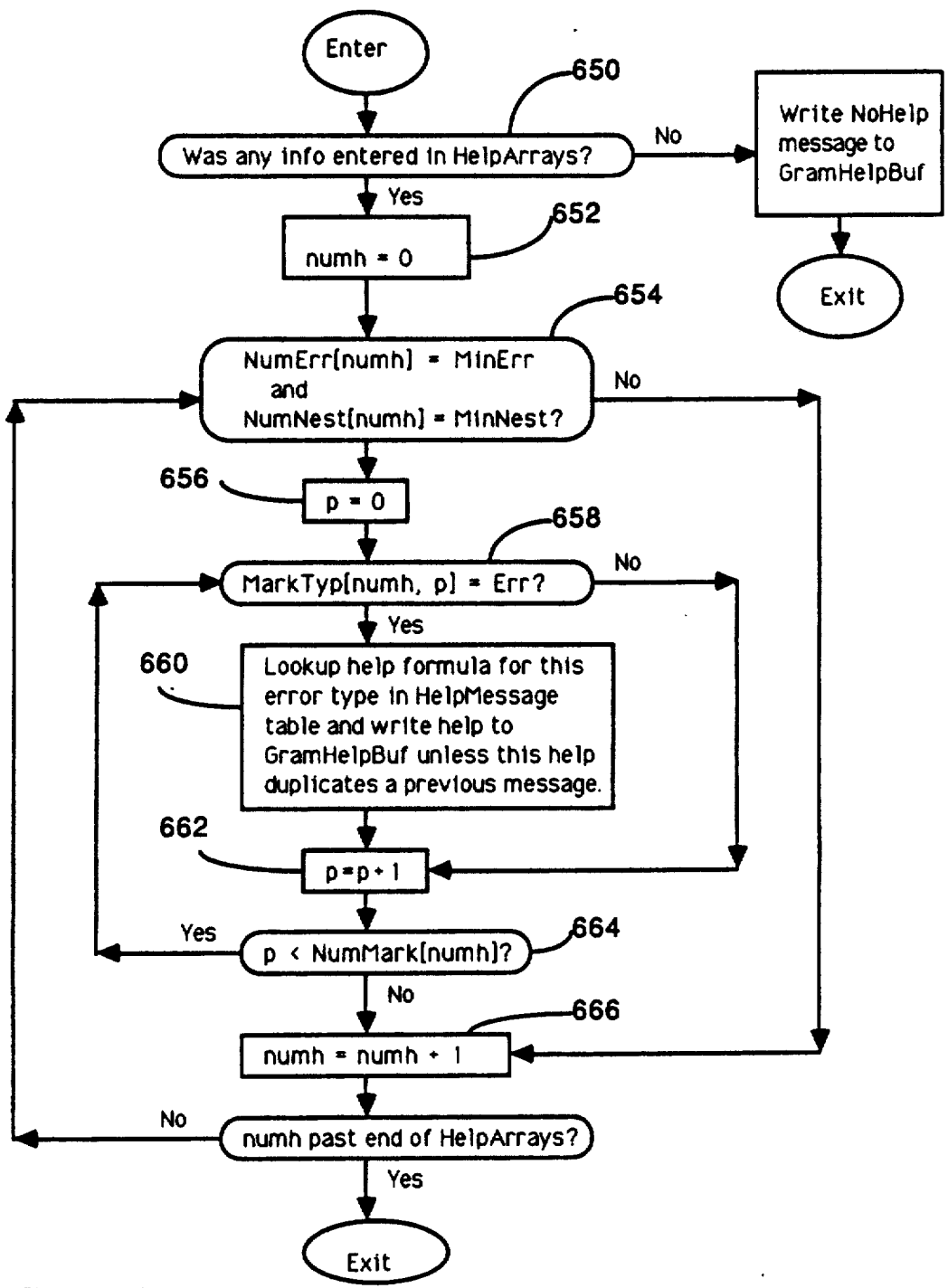

Referring now to FIG. 9b, there is shown a flowchart of the process used to format the grammar help messages output by the grammar help system to the user's word processor. As described above, the help messages are preceded by suitable introductory phrases, and representative help messages are listed in Table IV. In addition, "bad" non-terminals result in the display of the input words that were processed to create the "bad" non-terminal. For example, inputting "the boy he went home" gives "the boy he" as the help message because the phrase parsing module 40-2 combines those words into a bad-singular-noun-phrase.

As the grammar help module 80 begins to determine the output messages, it references a pair of numbers (MinErr and MinNest) that specify the minimum number of errors and nestings for all the active grammar paths in the path log 70-2. The only paths selected for help will be those for which the path variables NumErr[path] and NumNest[path]match this pair (step 654). It is often the case that more than one help message is presented by the grammar help module 80 because more than one word or group of words in the input text can be deemed erroneous by the grammar modules 40.

For each selected path, the help module 80 scans the list MarkTyp[.] to identify the error-type entries that are included (steps 658-664). On encountering an error-type entry (step 658), the help module 80 follows the prescription for rendering help for that error-type stored in the lookup table 90 (step 660). For example, on identifying a subject-verb-agreement error at level 0, the help module 80 rescans the list MarkTyp[.] to find all entries labeled as subject or verb at level 0. For each of these entries, the lists storing the start and end locations, MarkStr[.] and MarkEnd[.], of the subject or verb at the corresponding index are accessed to print the word or words from the sentence buffer 60 that parsed to the subject or verb identified in MarkTyp[.]. These words are written to the GramHelpBuf 82.

After each help message is added to the GramHelpBuf 80, a check is made to see whether the identical message has already been entered (step 660). If so, the most recent copy of the message is erased from the buffer. Duplicate messages can result at this stage of help processing because it is possible that several different parsings result in displaying the same set of words from the original sentence.

It will be noted that the present description and drawings are illustrative only and that one of ordinary skill in the art would recognize that various modifications could be made without departing from the spirit or scope of the present invention which is to be limited only by the following claims.

TABLE I

Syntactical Tags

Punctuation:
| | |
|---|---|
| PER | Period |
| LPAR | left parenthesis |
| RPAR | right parenthesis |
| COMM | comma |
| COLO | colon |
| HYPH | hyphen |
| QUOT | quotation mark |

Determiners and related forms:
| | |
|---|---|
| THE | the |
| AAN | a, an |
| DET | singular determiner: each, another, this, etc. |
| DET1 | sing. or pl. determiner: any, some, etc. |
| DETS | plural determiner: these, those |
| ELSE | else's |
| PD | singular pre-determiner: half, all, etc. (e.g., "All the milk is spilt.") |
| PDQ | qualifying pre-determiner: quite, such, etc. (e.g., "He's such a bore.") |
| PDS | plural pre-determiner: all, both, etc. (e.g., "All the cookies were eaten.") |

Prepositions:
| | |
|---|---|
| AT | at |
| FOR | for |
| OF | of |
| IN | preposition: in, on, over, by, etc. |

Conjunctions:
| | |
|---|---|
| AS | as (as in "... as ADJ as ...") |
| AND | "and" for conjoining noun phrases |
| CC | conjunction for clauses: and, or |
| CCC | Coordinating conjunction: either, both, etc. |
| CS | subordinating conjunction: if, because, although, etc. |
| IF | if |
| NEOR | "or" for conjoining noun phrases |

Verb Forms:
| | |
|---|---|
| MOD | modal: could, will, should, must, etc. |
| BE | be |
| BED | were |
| BEDZ | was |
| BEG | being |
| BEM | am |
| BEN | been |
| BER | are |
| BEZ | is |
| DO | do (auxiliary verb only) |
| DOD | did (auxiliary verb only) |
| DOZ | does (auxiliary verb only) |
| GD | got |
| HV | have (auxiliary verb only) |
| HVD | had (auxiliary verb only) |
| HVG | having (auxiliary verb only) |
| HVZ | has (auxiliary verb only) |
| VB | verb base form (plural present, used with modals & infinitives) |
| VBD | verb past tense (e.g., "went") |
| VBG | present participle (e.g., "going") |
| VBN | past participle (e.g., "gone") |
| VBZ | simple present tense singular (e.g., "goes") |
| ZVB | verb taking sentential objects, base form |
| ZVD | inflection of sentential object verb |
| ZVG | inflection of sentential object verb |
| ZVN | inflection of sentential object verb |
| ZVZ | inflection of sentential object verb |
| TO | "to"; infinitive marker |

TABLE I-continued

Syntactical Tags

Numbers:
| | |
|---|---|
| ONE | the number "one" |
| NUMS | numbers above 1: two, three, sixty, etc. |
| ORD | ordinal number: first, second, etc. |

Miscellaneous:
| | |
|---|---|
| EX | existential "here" and "there" |
| NEG | not |
| comp | compound from dictionary |

Adjectives:
| | |
|---|---|
| ADJ | adjective: good, etc. |
| ADJR | comparative: better, etc. |
| ADJT | superlative: best, etc |

Nouns:
| | |
|---|---|
| NABS | abstract noun; can be used with or without an article: work, etc. |
| NAPOS | possessive NABS: work's, etc. |
| NLOC | noun that can occur without an article after a preposition: e.g., "by heart" |
| NMAS | mass noun; cannot have an article: fun, etc. |
| NCOM | common noun; needs an article: cat, etc. |
| NCOMS | any plural noun: cats, people, etc. |
| NSPOS | any possessive plural noun: people's, etc. |
| NCPOS | possessive common noun: cat's, etc. |
| NPROP | proper noun (any capitalized word except sentence-initial) |
| NPS | plural proper noun |
| NPSTA | for "post" constructions requiring an article: lot, etc. |
| NPST | for "post" constructions requiring no article: most, etc. |
| NPPOS | possessive proper noun: Bill's, etc. |
| NRL | locative adverbial noun: here, now, north, everywhere, etc. |

Pronouns and related forms:
| | |
|---|---|
| PN | pronominal: each, some, etc. |
| PNS | plural pronominal: many, etc. |
| PNPOS | possessive pronominal: someone's, etc. |
| ITS | its |
| NMPP | plural object: them, etc. |
| PPI | I |
| PPRF | singular reflexive: myself, himself, etc. |
| PPRS | plural reflexive: ourselves, themselves, etc. |
| PPO | singular object: him, etc. |
| PPS | singular personal: he, she, it |
| PPSS | plural personal: we, they, you |
| PPPOS | singular personal possessive: my, your, her, his, etc. |
| PPPOSP | personal possessive: mine, yours, hers, his, etc. |
| QUAL | qualifier: quite, very, too, etc. |
| WQUAL | e.g., "How" |

Adverbs:
| | |
|---|---|
| AVRB | adverb: fast, quickly, etc. |
| ADVRBN | negative adverb: never, scarcely, etc. |
| AVRBR | comparative adverb: more, less, etc. |
| AVRBT | superlative adverb: most, least, etc. |
| AVRNT | time adverbial noun: today, Sunday, soon, etc. |
| AVRNS | plural AVRNT: Tuesdays, etc. |
| PART | particle: up, out (e.g., "give up," "work out") |
| SO | "so" |
| UGH | interjection: hello, well, etc. |

Question Words:
| | |
|---|---|
| WDT | wh-determiner: what, which, etc. |
| WPO | object wh-pronoun: whom, which, what, etc. |
| WPS | subject wh-pronoun: who, which, what, etc. |
| WPPOS | possessive wh-pronoun: whose, etc. |
| WRB | wh-adverb: when, where, why, etc. |

TABLE II

Non-Terminals

Nouns
| | |
|---|---|
| Sns1 | subject only, 1st person singular: e.g., "I" |
| Sns2 | subject only, plural: e.g., "you", "he and I" |
| Sns3 | subject only, 3rd person, singular: e.g., "she" |
| Snbb | subject or object, 3rd person, singular or plural: e.g., "mine" |
| Snbs | subject or object, singular: e.g., "the cat" |

TABLE II-continued

Non-Terminals

| | |
|---|---|
| Snbp | subject or object, plural: e.g., "the cats" |
| Sno | object only, singular: e.g., "him" |
| Snop | object only, plural: e.g., "them" |
| Swnb | singular and plural wh-noun: e.g., "whose" |
| Swns | singular wh-noun: e.g., "whose hat" |
| Swnp | plural wh-noun: e.g., "whose shoes" |
| Swps | wh-subject: e.g., "that", "who" |
| Swpo | wh-object: e.g., "that", "whom" |

Verbs

| | |
|---|---|
| Sbem | "am" |
| Sber | "are" |
| Sbez | "is" |
| Sbed | "were" |
| Sbdz | "was" |
| Sbeg | "being" |
| Shv | "have" |
| Shvz | "has" |
| Shvd | "had" |
| Sdo | "do" |
| Sdoz | "does" |
| Sdod | "did" |
| Svb | verb in base form: e.g., "go" |
| Svbz | verb with third person singular ending: e.g., "goes" |
| Svbd | verb in past tense |
| Svbg | verb ending in -ing: e.g., "wanting" |
| Svbn | past participle: e.g., "gone" |
| Szvb | verb that takes a sentential object (i.e., a Z-verb): e.g., "know" |
| Szvbz | third person singular form of a verb that takes a sentential object |
| Szvbd | past tense of verb that takes sentential object |
| Smd | modal |
| Svbv | verb ending for "be" and true verb |
| Svhv | verb ending for "have" |
| Szvhv | Z-verb endings for "have" |
| Svbh | endings for "be" and "have" |
| Szvbh | Z-verb endings for "be" and "have" |
| Svmd | verb ending for modals |
| Szvmd | Z-verb endings for modals |
| Svmp | imperative verb |
| Szvmp | imperative Z-verb |
| Svmm | imperative verb, also ending for "do" and modals |
| Szvmm | imperative Z-verbs that are also endings for "do" and modals |
| Seip | singular existential subject-verb for "if" |
| Sexs | declarative existential subject-verb, singular |
| Sexp | declarative existential subject-verb, plural |
| Sexb | declarative existential subject-verb, singular or plural |
| Sqexs | interrogative existential subject-verb, singular |
| Sqexp | interrogative existential subject-verb, plural |
| Sqexb | interrogative existential subject-verb, singular or plural |

Miscellaneous

| | |
|---|---|
| Sand | noun phrase coordinator: e.g., "and" |
| Sor | noun phrase coordinator: e.g., "or" |
| Scc | coordinating conjunction |
| Scs | subordinating conjunction |
| Sfor | "for" |
| Sif | "if" |
| Sin | preposition |
| Sof | "of" |
| Sto | "to" following "have" |
| Sipp | idiomatic prepositional phrase |
| Sneg | "not" |
| Sjj | adjectival phrase |
| Spp | prepositional phrase |
| Spst | 'post', e.g., for "lots" |
| Spsts | 'post', e.g., for "a bunch" |
| Srb | common adverb |
| Srbn | negative adverb |
| Srl | location adverbial |
| Srp | particle |
| Ssrb | adverb for beginning of sentence |
| Swrb | wh- adverb |
| Sxcm | comma in noun phrase |
| Sxco | colon |
| Sxhy | hyphen |
| Sxlp | left parenthesis |
| Sxqu | quotation mark |
| Sxrp | right parenthesis |
| Sxxcm | comma for separating clauses |
| Szcc | conjunction for prepositional phrases, adjectives and verbs |

"Bad" Non-Terminals

| | |
|---|---|
| Szxxe | existential without verb, as in "There a fly in my soup." |
| Szxex | other bad existentials, e.g., "There been . . ." |
| Szxjj | double adjective, e.g., "real happy" |
| Szxma | noun phrase missing article, as in "I saw cat" |
| Szxnb | confusion between number of determiner and noun, e.g., "a cats" |
| Szxnm | mass noun with article, e.g., "a money" |
| Szxnp | bad plural noun phrase, e.g., "five girl", "the kids toys" |
| Szxns | bad singular noun phrase, e.g., "a house blue", "John Smith he . . ." |
| Szxpp | bad prepositional phrase, e.g., "with he" |
| Szxvb | bad adverbial phrase, e.g., "several time" |
| Szxrb | bad verb ending, e.g., "to liked" |
| Szxxv | bad ending for modals, as in "He could have eat." |

TABLE III

Tags Used in Grammar Modules but not in Dictionary

| | |
|---|---|
| CC2 | CC (connects prepositional phrases, adjectives, and verbs) |
| COMM2 | COMM separating clauses |
| NAMN | NABS, NMAS, NCOM, VBG, ONE (i.e., any noun) |
| NAMV | NABS, NMAS, VBG (i.e., a noun that occurs without article) |
| XVNN | NABS, NCOM, VBG, ONE (i.e., nouns that take articles) |
| XZBE | BE, VB |
| XZBN | BEN, VBN |
| XZVB | VBG, VBN |
| XVAJ | ADJ, VBN, VBG, ORD, ZVG, ZVN (i.e., a generic adjective form) |
| ZZD | THE, ONE, DET, DET1, NAPOS, NCPOS NPPOS, PNPOS, PPPOS, WPPOS (i.e., singular determiner-general case) |
| ZZDS | THE, NUMS, DETS, DET1, NAPOS, NCPOS, NPPOS, PNPOS, PPPOS, WPPOS (i.e., plural determiner-general case) |

TABLE IV

Representative Actions and Error Types Used in Sentence Checking

Actions:

| | |
|---|---|
| [ss] | saw subject: adjust scoreboard, set VrbSt[.], write Subject & level in NonTerStr |
| [sv] | saw verb: adjust scoreboard, set VrbPartSt[.], write Verb & level in NonTerStr |
| [ssv] | saw subject & verb: adjust scoreboard, set VrbSt[.] and VrbPartSt[.], write Subject & Verb & level in NonTerStr |
| [ques] | saw first part of verb for question: adjust scoreboard, write Verb & level in NonTerStr |
| [inc] | need to nest: set ClauseSt[.], increment level |
| [dec] | need to unnest: decrement level, state becomes ClauseSt[.] |
| [uv-1] | saw another verb: jump to VrbSt[.] and process this non-terminal |
| [uv2] | saw another verb part: jump to VrbSt[.] and reprocess this non-terminal |
| [ssin] | saw subject that starts nested clause: set ClauseSt[.], increment level, reprocess this non-terminal |
| [mss] | saw additional parts of subject: write Subject & level in NonTerStr |
| [msv] | saw additional parts of verb: write Verb & level in NonTerStr |

Error Types:
(These also indicate the type of help given and a sample

TABLE IV-continued

Representative Actions and Error Types Used in Sentence Checking sentence with each error.)

| | |
|---|---|
| {sva} | subject-verb agreement: print subject-and-verb-at-this-level, e.g., "**He are." |
| {bs} | bad subject: print subject-at-this-level, e.g., "**Him and her are going." |
| {bv} | bad verb: print verb-at-this-level, e.g., "**I could have go." |
| {ms} | missing subject: print <Who/What?> verb-at-this-level, e.g., "**Goes home." |
| {mv} | missing verb: print subject-at-this-level <must act or be>, e.g., "**The cat the rat." |
| {mw} | missing word: print previous-word <?> this-word, e.g., "**It might been better." |
| {ms&v} | missing subject and verb: print <Who does what?>, e.g., "**In the park" |
| {dneg} | double negative: print this-word <extra negative>, e.g., "**He an— never find it." |
| {nend} | can't end a sentence here: print words-for-this-non-terminal, e.g., "**We were happy and." |
| {bon} | bad object number: print previous-word words-for-this-non-terminal, e.g., "**There is many reasons." |
| {boc} | bad object case: print previous-word words-for-this-non-terminal, e.g., "**I like they." |

Note: **indicates a sentence with one or more grammatical errors.

TABLE V

Representative Sentence Checking Rules for the state SOM

SOM: — "start of message," beginning of each sentence

| | |
|---|---|
| $ns1 NS1: [ss] | <I> like ice cream. <I> am a linguist. |
| $ns2 NS2: [ss] | <We> like ice cream. <We> are linguists. |
| $ns3 NS3: [ss] | <He> likes ice cream. <She> is a linguist. |
| $nbs NBS: [ss] | <The cat> likes it. <The cat> is funny. |
| $nbp NBP: [ss] | <The cats> like it. <The cats> are funny. |
| $vb SV: [ssv] | <Give> it to me! |
| $bem QB1: [ques] | <Am> I bothering you? |
| $doz QDZ: [ques] | <Does> he like it? |
| $cs SOC: [inc] | [<Because> you left], we left too. |
| $no NS3: {bs} [ss] | ** <Him> saw me. |
| $nop NS2: {bs} [ss] | ** <Her and him> saw you do it. |
| $vbz SV: {ms} [ssv] | ** <Goes> to the store. |
| $vbd SV: {ms} [ssv] | ** <Went> to the store. |

Note: ** indicates a sentence with one or more grammatical errors.

What is claimed is:

1. A language parsing system for processing a string of words, comprising:
   means for entering into the system strings of characters comprising words;
   means for assigning syntax tags to entered words;
   parsing means for grouping syntax tags of entered words into phrases according to a first set of predetermined grammatical rules relating the syntax tags to one another;
   checking means for verifying the conformance of sequences of the phrases to a second set of predetermined grammatical rules relating the phrases to one another; and
   control means for coordinating the assigning means, parsing means and checking means;
   wherein the system processes each word of the word string upon entry of such word.

2. The parsing system of claim 1, wherein the system further comprises memory means for storing the syntax tags and phrases in lookup tables and the checking means verifies a plurality of parallel sequences of the phrases, each of the plurality of parallel sequences comprising a respective one of the sequences that are possible for the entered words.

3. The parsing system of claim 2, further comprising means for providing grammar help, wherein the checking means indicates the locations in the parallel sequences of subjects, verbs, and deviations from the sets of rules, and the grammar help providing means provides a predetermined help message for a sequence having such a deviation.

4. The parsing system of claim 3, wherein the parsing means addresses a lookup table that includes the first set of rules, the first set comprises first and second subsets, the rules in the second subset denote types of deviations from the rules in the first subset, the checking means indicates the location and type of such deviations in the parallel sequences, and the grammar help providing means provides help messages comprising explanations for correcting the deviations.

5. The parsing system of claim 1, wherein the assigning means assigns syntax tags to each entered word upon such word being entered.

6. The parsing system of claim 1, wherein the assigning means looks up words in a dictionary as each word is entered and deduces syntax tags for words not found in the dictionary based on the endings of such words.

7. The parsing system of claim 1, further comprising combining means for combining phrases produced by the parsing means into combinations thereof and the checking means verifies the conformance of sequences of the combinations to predetermined grammatical rules relating the combinations to one another.

8. The parsing system of claim 1, wherein the control means converts a selected plurality of syntax tags from the assigning means into a smaller plurality of translated tags, each translated tag representing a predetermined plurality of the selected syntax tags, and the translated tags from the control means and syntax tags from the assigning means being grouped by the parsing means.

9. A language parsing system for processing a sentence of at least one word, comprising:
   means for entering characters comprising the words of the sentence into the system;
   means for identifying syntax tags associated with entered words;
   means for grouping the syntax tags into phrases;
   means for combining predetermined phrases into combinations thereof;
   means for checking the conformance of sequences of the phrase combinations and phrases not combined into the phrase combinations to a set of predetermined checking rules relating the phrases and phrase combinations to one another; and
   control means for coordinating operation of the identifying means, the grouping means, the combining means and the checking means;
   wherein the identifying means identifies syntax tags and the grouping means groups the tags before the sentence is completely entered.

10. The parsing system of claim 9, wherein the identifying means, grouping means, combining means and checking means access a plurality of lookup tables that contain words associated with syntax tags, groups of syntax tags associated with phrases, groups of phrases associated with phrase combinations, and the set of checking rules.

11. The parsing system of claim 9, further comprising means for deducing syntax tags, wherein the identifying means finds entered words in a dictionary lookup table including words associated with syntax tags and the deducing means deduces syntax tags based upon the endings of words not found in the dictionary lookup table.

12. The parsing system of claim 9, further comprising means for providing grammar help, wherein the checking means checks a plurality of parallel sequences of the phrase combinations and phrases not combined into the phrase combinations, each of the plurality of parallel sequences comprising a respective one of the sequences that are possible for the entered words, and indicates the locations in the parallel sequences of subjects, verbs, and deviations from the set of checking rules, and the grammar help providing means provides predetermined help messages for correcting the deviations.

13. The parsing system of claim 12, wherein the grouping and combining means address lookup tables including first and second sets, respectively, of rules relating to both correct and incorrect grammatical usages of words, wherein the rules in the second set denote types of deviations from the rules in the first set, the checking means indicates the location in the parallel sequences of predetermined deviation types, and the grammar help providing means provides help messages for correcting the deviation types.

14. The parsing system of claim 13, wherein the grammar help providing means identifies any rules from the second set used by the grouping and combining means.

15. The parsing system of claim 9, wherein the system operates in conjunction with a work processor in a digital computer and the entering means includes a keyboard.

16. The parsing system of claim 15, wherein the entering means retrieves the entered words from a memory.

17. The parsing system of claim 9, wherein the checking means checks a plurality of parallel sequences of the phrase combinations and phrases not combined into phrase combinations, each of the plurality of parallel sequences comprising a respective one of the sequences possible for the entered words.

18. The parsing system of claim 9, wherein the control means converts a selected plurality of syntax tags from the identifying means into a smaller plurality of translated tags, each translated tag representing a predetermined plurality of the selected syntax tags, and the translated tags from the control means and syntax tags from the identifying means being grouped by the grouping means.

19. In a digital computer for processing information, a language parsing system for processing a sentence of at least one word, comprising:
means for entering characters comprising the words of the sentence into the system;
means for locating syntax tags of entered words in a dictionary lookup table as each word is entered;
means for deducing syntax tags for words not found in the dictionary, wherein the syntax tags are deduced from the words not found in the dictionary;
parsing means for locating phrases associated with the entered words in a first lookup table mapping sequences of syntax tags into phrases, wherein the phrases are located as each word is entered;
combining means for combining phrases by locating phrases combinations in a second lookup table mapping sequences of phrases into phrase combinations;

checking means for verifying, as each word is entered, the conformance of sequences of the phrase combinations and phrases not combined into the phrase combinations to a set of predetermined grammatical rules relating phrases and phrases combinations to one another, the checking means being responsive to the combining means; and
control means for coordinating operation of the locating means, the deducing means, the parsing means, the combining means and the checking means.

20. The parsing system of claim 18, wherein the system operates in conjunction with a word processor.

21. The parsing system of claim 18, where the system includes at least one ROM.

22. The parsing system of claim 18, further comprising means for providing grammar help, wherein the lookup tables include rules relating to both correct and incorrect grammatical usages and the checking means verifies a plurality of parallel sequences of the phrase combinations and phrases not combined into the phrase combinations, each of the plurality of parallel sequences comprising a respective one of the sequences possible for the entered words and indicates the locations in the parallel sequences of subjects, verbs, and deviations from the set of rules, and the grammar help providing means identifies the deviations, indicates the incorrect phrases, and provides predetermined help messages for correcting the incorrect phrases.

23. The parsing system of claim 18, wherein the control means converts a selected plurality of syntax tags from the locating means into a smaller plurality of translated tags, each translated tag representing a predetermined plurality of the selected syntax tags, and the translated tags from the control means and syntax tags from the locating means being grouped by the parsing means.

24. A method for parsing a natural language sentence of at least one word, comprising the steps of:
assigning syntax tags to the words of the sentence;
phrase parsing a sequence of the words by grouping the syntax tags assigned to the words of the sequence into phrases; and
sentence checking by verifying the conformance of a plurality of parallel sequences of the phrases to a set of predetermined grammatical rules relating the phrases to one another.

25. The method of claim 24, wherein the method is carried out in a digital computer on strings input from a keyboard.

26. The method of claim 24, wherein the method is carried out in a digital computer on strings input from a memory.

27. The method of claim 24, further comprising the steps of looking up the words in a dictionary and of deducing syntax tags for words not found in the dictionary based upon the endings of such words.

28. The method of claim 27, wherein the method is carried out in a digital computer.

29. The method of claim 24, further comprising the step of combining phrases into phrase combinations, wherein the sentence checking step includes verifying the conformance of a plurality of parallel sequences of the phrase combinations and phrases not combined into the phrase combinations to a set of predetermined grammatical rules relating phrases and phrase combinations to one another, each of the plurality of parallel sequences comprising a respective one of the sequences possible for the words of the sentence.

30. The method of claim 24, further comprising the step of converting selected syntax tags into translated tags, wherein each translated tag represents a predetermined plurality of the selected syntax tags, and the phrase parsing step includes grouping syntax tags and translated tags into phrases.

31. A method of parsing a natural language sentence of at least one word, comprising the steps of:
assigning syntax tags to the words of the sentence;
grouping the syntax tags assigned to sequences of the words into phrases according to a set of predetermined rules;
combining the phrases into a plurality of parallel sequences of phrase combinations and phrases not combined into the phrase combinations, each of the plurality of parallel sequences comprising a respective one of the sequences possible for the words of the sentence; and
comparing the plurality of parallel sequences of phrases and phrase combinations to the set of grammar rules.

32. The method of claim 31, further comprising the step of looking up the words in a dictionary to retrieve the assigned syntax tags.

33. The method of claim 32, further comprising the step of deducing syntax tags for words not found in the dictionary from the endings of such words.

34. The method of claim 31, further comprising the step of sentence checking by verifying the conformance of the plurality of parallel sequences of the phrases and phrase combinations to first and second sets of predetermined grammar rules, wherein the first set includes rules relating to correct grammatical usage and the second set includes rules relating to deviations from the first set and denoting types of the deviations.

35. The method of claim 31, further comprising the step of converting selected syntax tags into translated tags, wherein each translated tag represents a predetermined plurality of the selected syntax tags, and the grouping step includes grouping syntax tags and translated tags into phrases.

36. A language parsing system for processing a sentence of at least one word, comprising:
input means for entering strings of characters,
a sentence buffer for storing input strings of characters;
a word dictionary, wherein syntax tags are stored in association with words comprising character strings;
lookup means for finding entered words in the word dictionary;
a phrase table, wherein non-terminals are stored in association with a predetermined set of phrase sequences of syntax tags;
phrase parsing means for finding the non-terminals from the phrase table associated with the phrase sequences of the syntax tags of the entered words as the words are entered;
a sentence table, wherein is stored a predetermined set of sentence checking rules in association with sentences of non-terminals;
means for sentence checking, the sentence checking means applying the sentence checking rules in the sentence table to the sentences of non-terminals from the phrase parsing means to verify the conformance of the non-terminal sentences to the sentence checking rules; and
control means for coordinating the lookup means, phrase parsing means and sentence checking means, the control means tracking a plurality of parallel grammar paths representing states of the phrase parsing means and sentence checking means produced as the words are entered.

37. The system of claim 36, wherein the word dictionary includes a set of a plurality of syntax tag deduction rules for deducing syntax tags based on the characters in entered words, and the lookup means assigns syntax tags to entered words not found in the word dictionary according to the plurality of syntax tag deduction rules.

38. The system of claim 37, wherein the lookup means assigns syntax tags to entered words not found in the dictionary according to the deduction rules based on the endings of such words.

39. The system of claim 37, wherein the set of syntax tag deduction rules includes first and second subsets of rules, the second subset of rules providing for exceptions to the first subset.

40. The system of claim 36, wherein the phrase table includes a plurality of syntax tag deduction rules for deducing syntax tags based on the characters in entered words, and the phrase parsing means assigns syntax tags to entered words not found in the word dictionary according to the plurality of syntax tag deduction rules.

41. The system of claim 40, wherein the syntax tag deduction rules are rules for deducing syntax tags based on ending characters in entered words.

42. The system of claim 36, further comprising a spelling output buffer and an error flag, wherein the lookup means writes entered words not found in the word dictionary to the spelling output buffer and sets the error flag, and the error flag indicates the number of erroneous characters of the entered words not found in the word dictionary.

43. The system of claim 36, further comprising a phrase combination table, wherein predetermined non-terminals are stored in association with predetermined sequences of non-terminals, and means for phrase combining, the phrase combining means finding non-terminals from the phrase combination table associated with the sequences of non-terminals for the entered words from the phrase parsing means, and wherein the sentence checking means applies the set of sentence checking rules to the sentences of non-terminals from the phrase combining means.

44. The system of claim 36, further comprising a grammar path data area, wherein the control means tracks the plurality of parallel grammar paths by storing the paths in a working path and a path log in the grammar path data area.

45. The system of claim 44, further comprising a grammar help table, means for providing grammar help, and a grammar help buffer, wherein the grammar help table stores explanations for correcting deviations from the set of sentence checking rules in the entered sentence, and the grammar help providing means finds an explanation in the grammar help table based on non-terminal strings for the entered words stored in the grammar path data area and outputs the explanation to the grammar help buffer.

46. The system of claim 45, further comprising a grammar help data area, wherein the grammar help providing means finds the explanation in the grammar table by storing in the grammar help data area a synopsis of the grammar paths in the grammar path data area.

47. The system of claim 45, wherein at least one of the phrase table stores non-terminals in association with a second set of predetermined phrase sequences deviating from the set of predetermined phrase sequences and the sentence table stores a second predetermined set of sentence checking rules in association with sentences of non-terminals deviating from the set of sentence checking rules.

48. The system of claim 47, further comprising a grammar output flag for indicating when the entered words conform to at least one of the second sets.

49. The system of claim 36, further comprising a translated tag table, wherein translated tags are stored in association with selected syntax tags and each translated tag represents a predetermined plurality of the selected syntax tags, and means for translating tags, the translating means finding the translated tags from the translated tag table associated with the syntax tags of the entered words, and wherein the phrase table stores non-terminals in association with a predetermined set of phrase sequences of syntax tags and translated tags.

50. In a computer, a method for parsing a natural language by processing sentences, each having at least one word, comprising the steps of:
    entering a sentence;
    storing the entered sentence;
    finding syntax tags associated with the entered words in a word dictionary;
    finding in a phrase table non-terminals associated with the syntax tags associated with the entered words as each word is entered;
    applying sentence checking rules associated with sequences of non-terminals to the found non-terminals to verify the conformance of the found non-terminal sequences to the rules; and
    tracking a plurality of parallel grammar paths representing the found non-terminals as the words are entered, each of the plurality of parallel grammar paths comprising a respective one of the possible sequences of the found non-terminals.

51. The method of claim 50, further comprising the step of converting predetermined syntax tags associated with the entered words to translated tags, wherein each translated tag represents a predetermined plurality of the predetermined syntax tags and wherein the step of finding non-terminals includes finding non-terminals associated with the translated tags.

52. The method of claim 50, further comprising the step of combining the found non-terminals into combinations, and wherein the step of applying sentence checking rules includes applying sentence checking rules associated with sequences of non-terminals and combinations to the found non-terminals and combinations, and each of the plurality of grammar paths comprises a respective one of the possible sequences of the combinations and the found non-terminals not combined into combinations.

53. The method of claim 52, further comprising the step of deducing syntax tags for entered words not in the word dictionary from the endings of such words.

54. The method of claim 53, further comprising the step of providing explanations for correcting deviations from the sentence checking rules found in the entered sentence after applying the sentence checking rules.

* * * * *

UNITED STATES PATENT AND TRADEMARK OFFICE
CERTIFICATE OF CORRECTION

PATENT NO. : 4,994,966

DATED : February 19, 1991

INVENTOR(S) : Sandra E. Hutchins

Page 1 of 2

It is certified that error appears in the above-identified patent and that said Letters Patent is hereby corrected as shown below:

Col.3 line 39   [b,are] should be -- b, are --;
Col.7 line 12   [e.g.] should be -- e.g., --;
Col.11 line 5   [(1)] should be -- (1), --;
Col.12 line 52  [processes] should be -- processed --;
Col.14 line 7   [tag:] should be -- tag;--;
Col.20 line 47  [saVing] should be -- saving--;
Col.22 line 25  [system] should be -- system 1 --;

UNITED STATES PATENT AND TRADEMARK OFFICE
CERTIFICATE OF CORRECTION

PATENT NO. : 4,994,966
DATED : February 19, 1991
INVENTOR(S) : Sandra E. Hutchins It is certified that error appears in the above-identified patent and that said Letters Patent is hereby corrected as shown below:

Col.22 line 38  [Thus] should be -- Thus, --;

Col. 26, line 8, sentence: should read --sentence: --

Col.26 line 10  [):] should be -- ); --;

Col.26 line 12  [):] should be -- ); --;

Col. 30, line 58 [uv-1] should be -- uv1 --;

Col.31 line 18  [He an - never] should be -- He can't never -- and

Col.33 line 66  [phrases] should be -- phrase --.

Signed and Sealed this

First Day of June, 1993

Attest:

Attesting Officer

MICHAEL K. KIRK

Acting Commissioner of Patents and Trademarks

UNITED STATES PATENT AND TRADEMARK OFFICE
CERTIFICATE OF CORRECTION

PATENT NO.  : 4,994,966
DATED       : February 19, 1991
INVENTOR(S) : HUTCHINS

It is certified that error appears in the above-identified patent and that said Letters Patent is hereby corrected as shown below:

Col. 34, line 12    "18" should be --19--;
col. 34, line 14    "18" should be --19--;
col. 34, line 16    "18" should be --19--; and
col. 34, line 30    "18" should be --19--.

Signed and Sealed this

Twentieth Day of July, 1993

Attest:

MICHAEL K. KIRK

Attesting Officer    Acting Commissioner of Patents and Trademarks